United States Patent [19]
Terada

[11] Patent Number: 5,583,593
[45] Date of Patent: Dec. 10, 1996

[54] PHOTOGRAPHED PICTURE SIZE SWITCHABLE CAMERA

[75] Inventor: Hiroshi Terada, Mitaka, Japan

[73] Assignee: Olympus Optical Co., Ltd., Tokyo, Japan

[21] Appl. No.: 310,215

[22] Filed: Sep. 21, 1994

Related U.S. Application Data

[63] Continuation of Ser. No. 1,174, Jan. 7, 1993, abandoned.

[30] Foreign Application Priority Data

Jan. 14, 1992 [JP] Japan ................................ 4-005125

[51] Int. Cl.$^6$ ......................................... G03B 17/02
[52] U.S. Cl. ............................................. 396/435; 396/85
[58] Field of Search ........................ 354/106, 159, 354/94, 195.1, 219, 269

[56] References Cited

U.S. PATENT DOCUMENTS

| | | | |
|---|---|---|---|
| Re. 32,797 | 12/1988 | Harvey | 354/481 |
| 4,047,207 | 9/1977 | Altman et al. | 354/155 |
| 4,099,849 | 7/1978 | Lawson et al. | 350/214 |
| 4,583,831 | 4/1986 | Harvey | 354/106 |
| 4,814,866 | 3/1989 | Dillard et al. | 358/60 |
| 4,973,997 | 11/1990 | Harvey | 354/106 |
| 5,010,357 | 4/1991 | Misawa | 354/159 |
| 5,016,032 | 5/1991 | Haraguchi et al. | 354/195.1 |
| 5,086,311 | 2/1992 | Naka et al. | 354/195.1 |
| 5,130,733 | 7/1992 | Taniguchi et al. | 354/400 |
| 5,181,057 | 1/1993 | Takagi et al. | 354/94 |
| 5,214,462 | 5/1993 | Haraguchi et al. | 354/187 |
| 5,227,824 | 7/1993 | Yoshida et al. | 354/195.12 |
| 5,257,055 | 10/1993 | Cho et al. | 354/222 |

FOREIGN PATENT DOCUMENTS

| | | |
|---|---|---|
| 35-25058 | 9/1960 | Japan . |
| 0032738 | 1/1991 | Japan . |
| 4-233526 | 8/1992 | Japan . |

Primary Examiner—Michael L. Gellner
Assistant Examiner—Nicholas J. Tuccillo
Attorney, Agent, or Firm—Louis Weinstein

[57] ABSTRACT

A photographed picture size switchable camera of the present invention can switch photographing optical systems and picture masks through a zoom driving mechanism by means of a switch input from zooming operation and can switch a photographed picture size from a normal size to a panoramic size or half size which is smaller than the normal size. Thus, a good picture can be taken even in a wide angle or telephotographic area which is wider or further than an ordinary zooming region.

17 Claims, 17 Drawing Sheets

PHOTOGRAPHED PICTURE SIZE SWITCHABLE CAMERA

This is a continuation of application Ser. No. 08/001,174, filed Jan. 7, 1993, now abandoned.

BACKGROUND OF THE INVENTION

1. Field of the Invention

The present invention relates to a camera capable of switching a photographed picture size from a normal size to a size smaller than the normal size.

2. Related Art Statement

Recently, a camera's functions have been diversified. As one of the functions, photographed picture sizes can be switched. Especially, in a camera having a photographed picture of an ordinary normal size (24 mm×36 mm) and having no problems, such as vignetting, insufficient quantity of light and aberration, various switching means for switching a photographed picture size from a panoramic size to the aforesaid normal size are proposed. For example, a camera attaching an adapter when it is used at the time of panorama and a camera capable of manually switching picture sizes with each other have been known. These cameras are formed so as to recognize a photographic range by switching finders, as well, when these photographed picture sizes are switched with each other.

With regard to a photographed picture size switching operation, a switching mechanism for manually switching a photographed picture size from the aforesaid normal size to a half size (24 mm×18 mm) is disclosed in Japanese Utility Model Laid Open No. 25058/1960. Further, in Japanese Patent Laid Open No. 233526/1992, an apparatus capable of electrically switching a photographed picture size from the aforesaid normal size to a panoramic size is proposed.

Further, a camera that can obtain a photographed picture of a panoramic size by attaching an adapter to a camera capable of zooming is proposed. The camera can zoom in and out a photographed picture of a panoramic size in addition to an ordinary photographic range.

In a camera currently being used, a photographed picture size is made to be a panoramic mode and a zoom is set in a wide area end, so that a panoramic effect can be demonstrated more efficiently.

However, there is necessity for photographers using a panoramic mode to take a picture of a wider range, that is, a wider angle. Nevertheless, a zooming camera is generally designed so that an outside diameter of a lens and a moving distance of a lens system become as small as possible. If a focal length is simply extended in a wide angle area, optical performance of the edges of a photographed picture of the normal size is likely to be insufficient due to the problems causing vignetting, insufficient quantity of light and aberration depending on photographing lens systems.

Photographing lenses of f=35–70 mm and f=35–105 mm in the present zoom type are generally used. Since use frequency in a telephotographic area is high, a zoom ratio becomes high when a focal length is simply extended to a wide angle area. Thus, the lens itself becomes larger and that becomes a big disadvantageous factor for a camera which is recently desired to be miniaturized.

OBJECTS AND SUMMARY OF THE INVENTION

An object of the present invention is to provide a photographed picture size switchable camera being able to switch a photographed picture size from a normal size to a size smaller than the normal size although the camera is small, and being able to take good pictures of any of the photographed picture sizes at all times.

Another object of the present invention is to provide a photographed picture size switchable camera being able to select a photographed picture size of a normal size and a size smaller than the normal size from the outside although the camera is small, and being able to take good pictures of any sizes at all times.

Another object of the present invention is to provide a photographed picture size switchable camera being able to automatically switch a photographed picture size from a normal size to a size smaller than the normal size with a zooming operation, and being able to take good pictures of any size at all times.

Another object of the present invention is to provide a photographed picture size switchable camera being able to take a good picture by switching a photographed picture size to an appropriate size even in an area where the optical performance of photographed picture edges deteriorates.

Another object of the present invention is to provide a photographed picture size switchable camera being able to take a picture in a wide angle which is wider than an ordinary zooming range without lowering the optical performance.

Another object of the present invention is to provide a photographed picture size switchable camera being able to take a picture in a wide angle which is wider than an ordinary zooming range from a shorter distance.

Another object of the present invention is to provide a photographed picture size switchable camera being able to take a picture in a further telephotographic area than an ordinary zooming range without lowering the optical performance.

Another object of the present invention is to provide a photographed picture size switchable camera being able to take a picture in a wide angle which is wider than an ordinary zooming range and in a further telephotographic area than the ordinary zooming range without lowering the optical performance.

Another object of the present invention is to provide a photographed picture size switchable camera making a part of a zooming range a photographing region of a photographed picture size being smaller than a normal size, and being able to take a good picture without being affected by deterioration of the optical performance.

Another object of the present invention is to provide a photographed picture size switchable camera making a part of a zooming range a photographing region of a photographed picture of a panoramic size being smaller than a normal size, and being able to take a good picture without being affected by deterioration of the optical performance.

Another object of the present invention is to provide a photographed picture size switchable camera making a part of a zooming range a photographing region of a photographed picture of a half size being smaller than a normal size, and being able to take a good picture without being affected by deterioration of the optical performance.

Another object of the present invention is to provide a photographed picture size switchable camera being able to take a picture at a focal length before switching a picture size when a photographed picture size is switched from a normal size to a size smaller than the normal size.

Another object of the present invention is to provide a photographed picture size switchable camera being able to take a picture in a photographed picture of a normal size and a panoramic size being smaller than the normal size without lowering the optical performance.

Another object of the present invention is to provide a photographed picture size switchable camera being able to take a picture in a photographed picture of a normal size and a half size being smaller than the normal size without lowering the optical performance.

Another object of the present invention is to provide a photographed picture size switchable camera being able to switch a photographed picture size to a finder visual field frame corresponding to a photographed picture size when a photographed picture size is switched from a normal size to a size smaller than the normal size, and being able to improve the operability when a picture is taken.

Another object of the present invention is to provide a photographed picture size switchable camera being able to switch a photographed picture size to magnification of finder corresponding to a photographed picture size when the photographed picture size is switched from a normal size to a size smaller than the normal size, and being able to improve the operability when a picture is taken.

Another object of the present invention is to provide a photographed picture size switchable camera being able to switch a photographed picture size to a finder visual field frame and magnification of finder corresponding to a photographed picture size when the photographed picture size is switched from a normal size to a size smaller than the normal size, and being able to improve the operability when a picture is taken.

In brief, a photographed picture size switchable camera of the present invention comprises photographed picture size selecting means being able to select a photographed picture size from a normal size to a size smaller than the aforesaid normal size, photographed picture size switching means for switching a photographed picture size to a size selected by the aforesaid photographed picture size selecting means, a photographing optical system being able to move to a specific position of an ultra-wide angle focal length in a region where optical performance of photographed picture edges deteriorates in a wide angle which is wider or further telephotographic area than an ordinary zooming region or in a wide angle which is wider than the ordinary zooming region when at least a picture size switched by the aforesaid photographed picture size switching means is smaller than the aforesaid normal size, and moving means for moving the photographing optical system.

Other features and advantages of the present invention will be apparent from the following description.

BRIEF DESCRIPTION OF THE DRAWINGS

FIGS. 2–18 illustrate the first embodiment of the present invention;

FIG. 3 is an exploded perspective view showing a main part thereof;

FIG. 4 is an enlarged elevational view showing a ring part of a picture switching mechanism looking from an object at a normal mode;

FIG. 5 is a sectional view taken along the section 5—5 in FIG. 4;

FIG. 6 is a sectional view taken along the section 6—6 in FIG. 7;

FIG. 7 is an enlarged elevational view showing a ring part of a picture switching mechanism looking from an object at a panoramic mode;

FIG. 9 is a side elevational view showing a concept of finder optical system;

FIG. 10 is an exploded perspective view showing an optical system of a finder unit;

FIG. 11 is a developed view of a cam part of a cam ring;

FIG. 12 is a side elevational view showing a main part of a photographing optical system;

FIG. 13 is a longitudinal sectional view showing a finder cam and a cam ring of a wide state in an N photographing mode;

FIG. 14 is a developed view showing a finder cam and a cam ring of a wide state in an N photographing mode;

FIG. 15 is a longitudinal sectional view showing a finder cam and a cam ring of a telephotographic state in a P photographing mode;

FIG. 16 is a developed view showing a finder cam and a cam ring of a telephotographic state in a P photographic state;

FIG. 17 is a block diagram showing a main part as electric construction;

FIG. 18 is a flowchart showing a switching operation of photographed picture sizes;

FIG. 19 is a developed view of a cam part of a cam ring;

FIG. 20 is a block diagram showing a main part as electric construction;

FIG. 21 is a flowchart showing a switching operation of photographed picture sizes;

FIG. 22 is a developed view of a cam part of a cam ring;

FIG. 23 is a developed view showing a finder cam and a cam ring in an N photographing mode;

FIG. 24 is a developed view showing a finder cam and a cam ring in a P photographing mode; and FIG. 25 is a flowchart showing a switching operation of photographed picture sizes.

DETAILED DESCRIPTION OF THE PREFERRED EMBODIMENTS

First of all, a basic concept of the present invention will be explained by FIG. 1.

Figure 1:
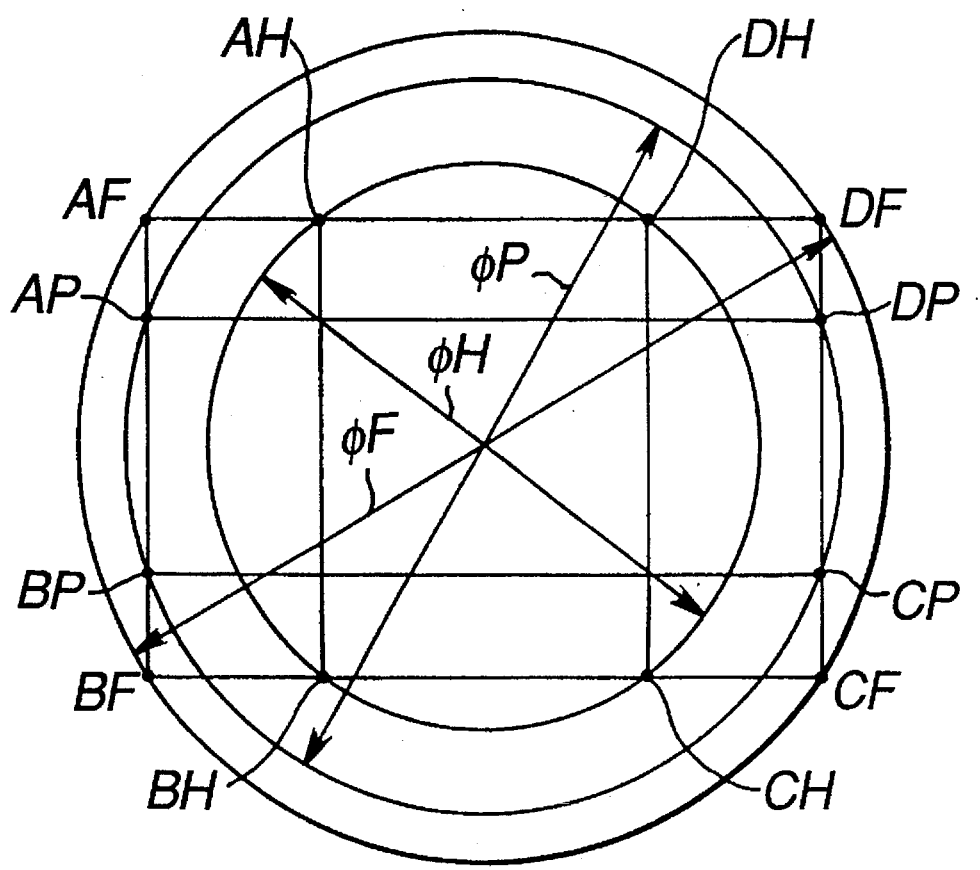
FIG. 1 is an operational diagram showing a basic concept of the present invention.

FIG. 1 is an operational diagram showing an image circle of a photographic lens used in a general zoom camera.

If the zoom camera is used to take a picture of a ordinary normal size (24 mm×36 mm), an image circle $\phi$ F is needed. $\phi$ F covers a photographed picture indicated by points AF-BF-CF-DF in FIG. 1. However, if a photographed picture size smaller than the aforesaid normal size, such as a panoramic size (e.g. 13 mm×36 mm) is set as the size indicated by the points AP-BP-CP-DP as shown in FIG. 1, the image circle covering the photographed picture may be an image circle represented by $\phi$ P. Further, if a photographed picture of a half size (24 mm×18 mm) is set as the size indicated by the points AH-BH-CH-DH as shown in FIG. 1, the image circle covering the photographed picture may be an image circle represented by φ H.

In other words, when a picture of a size smaller than the aforesaid ordinary normal size is taken, the image circle φ F is not always needed, so that a picture can be taken in an area exceeding a focal length range used in the photographed picture of the normal size. That is, if an area of a picture taken in a photographed picture of a normal size exceeds the aforesaid focal length range, performance of a photographing optical system deteriorates in the region of the photographed picture edges. For example, even if a photographic lens causes vignetting, insufficient quantity of light and aberration, a picture of a panoramic size or a half size can be taken in spite of the difficulty in photographing the normal-sized picture when the lens has an image circle φ P or φ H which covers a photographed picture of a panoramic size or half size.

The present invention skillfully uses the aforesaid phenomena. Embodiments which specifically materialize this invention will be explained in conjunction with the drawings.

FIG. 2 is a side elevational view showing a photographic operation system in a zoom camera which illustrates the first embodiment.

The photographing optical system is composed of, for example, zoom lenses of three times of focal lengths of f=35–105 mm, F No. 4.5–6.5 which are 12 lenses of group 10. The zooming of the photographing optical system has three-groups in the system. Each group has a positive power of the first lens group Le1, a positive power of the second lens group Le2 and a negative power of the third lens group Le3. Also, focusing is performed by the second lens group Le2. The shortest object distance is, for example, 0.8 m.

The state of the photographing optical system shown in FIG. 2(a) WIDE is the state at infinity of wide (wide state, hereinafter). The state of photographing optical system shown in FIG. 2(b) TELE is the state at infinity of telephotography (tele state, hereinafter). In each of these drawings, a dashed line of the right end is an image-formation surface 60 which is actually a position where a film is disposed. The part indicated by an arrow ahead of the second lens group (in the area of the first lens group) is a shutter part 61, which represents a sector moving with the second lens group as a unit. Reference symbols Lw and Lt in FIG. 2 represent the distance of focusing movement to point-blank ranges in the wide state and tele state, respectively.

In the case of such photographing optical system, while an interval between the first lens group and second lens group is being narrowed, the focal length is changing in the wide area. FIG. 2(c) OVER WIDE shows the state of the photographing optical system at that time. This state is an over wide state, hereinafter.

Next, a summary of a magnification variable photographing optical system and a finder optical system, and photographing picture size switching mechanism and a finder visual field frame switching mechanism of the zoom camera of the first embodiment will be explained.

Figure 3:
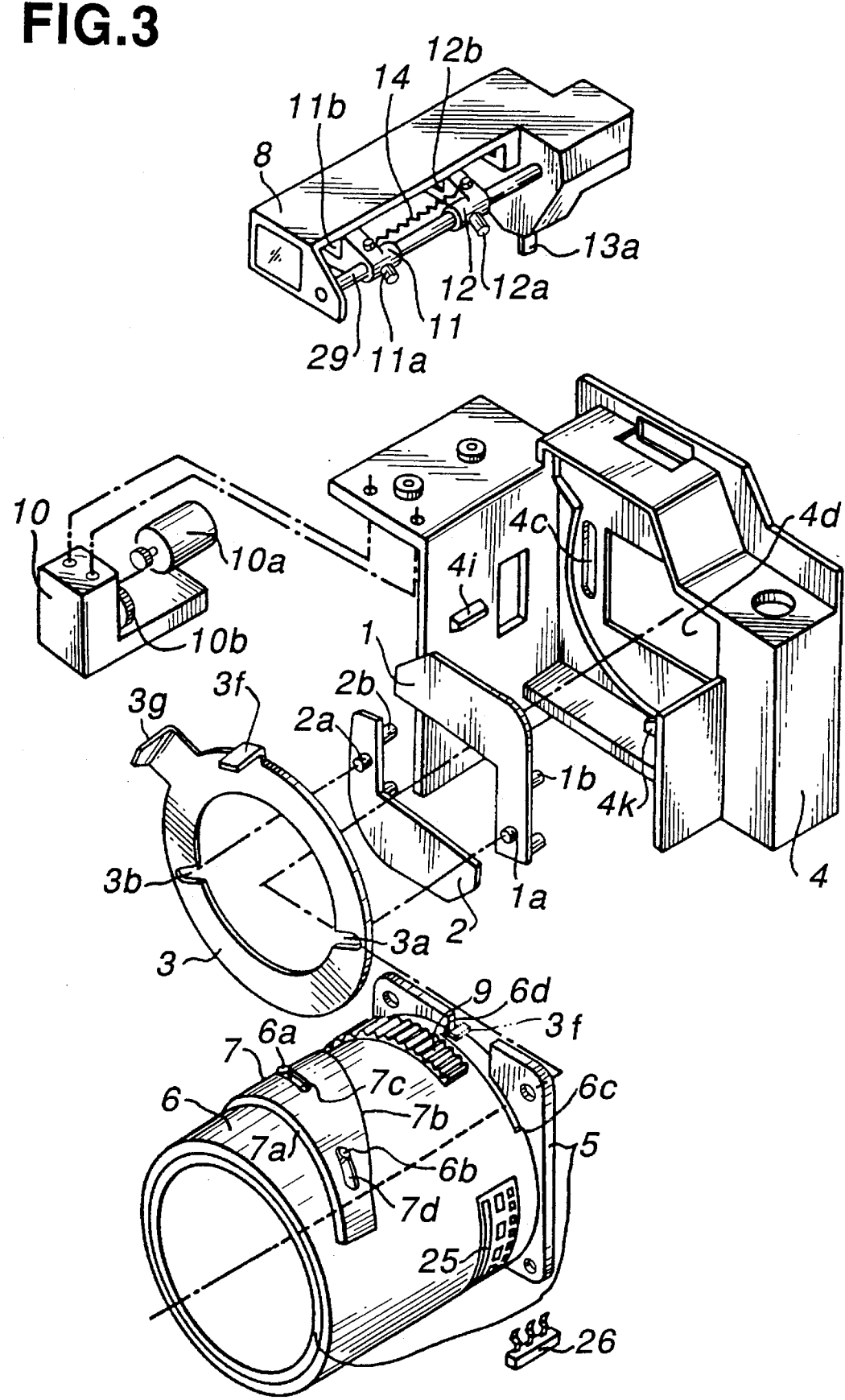

FIG. 3 is an exploded perspective view of the zoom camera in first embodiment.

The first embodiment is composed of a camera body 4, a lens barrel part, a finder unit, a zoom motor unit 10 and a photographed picture size switching mechanism. A photographed picture size is switched from an ordinary normal size (N size, hereinafter) at the time of the normal photographing mode (N photographing mode, hereinafter) to a half size or panoramic size (P size, hereinafter), for example, 13 mm×36 mm at the time of the panoramic photographing mode (P mode, hereinafter). In the case of the first embodiment, it will be explained that a normal-sized picture at N photographing can be switched to a panoramic picture size at P photographing.

The zoom motor unit 10 is supported by the camera body 4 and formed of a zoom motor 10a and gear 10b so as to drive a cam ring 6.

The lens barrel part is composed of a fixed frame 5, the cam ring 6 which forms a magnification variable driving mechanism of a photographing optical system and is supported by the fixed frame 5, a photographing lens not illustrated and an encoder for detecting a rotation phase of the cam ring 6. On the outer periphery of the cam ring 6, a finder cam 7 having first and second ranges, described later are arranged. The finder cam 7 can be rotated in the peripheral circumferential direction as guided by guide pins 6a and 6b of the cam ring 6 fitted into grooves 7c and 7d. A gear 9 meshing with the gear 10b is fixed to the cam ring 6. In addition, contact surfaces 6c and 6d which operate a P ring 3, described later, are provided on the outer periphery end part of the cam ring 6.

Figure 13:
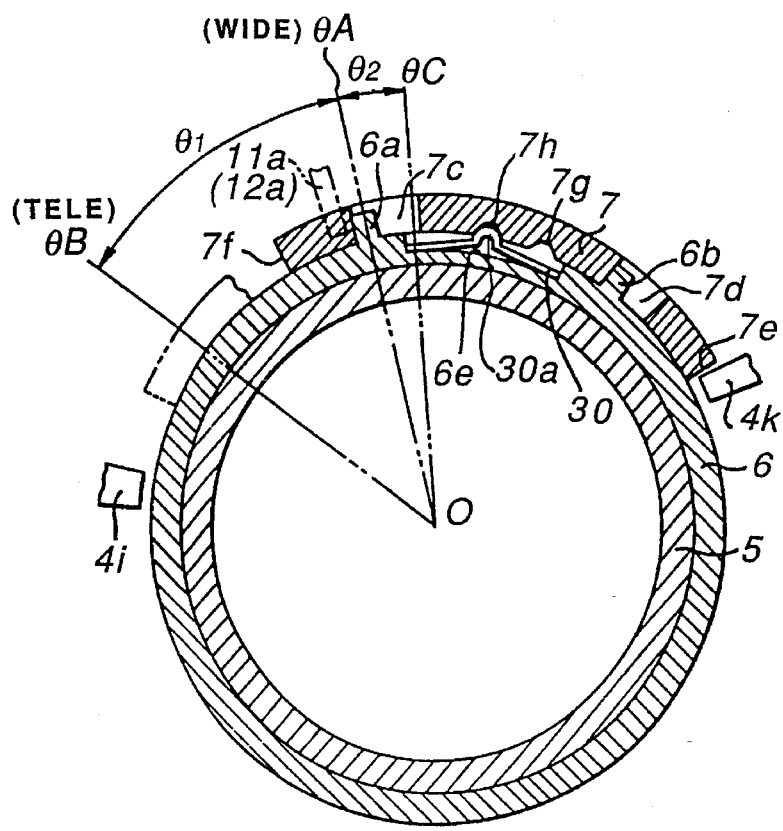
Figure 14:
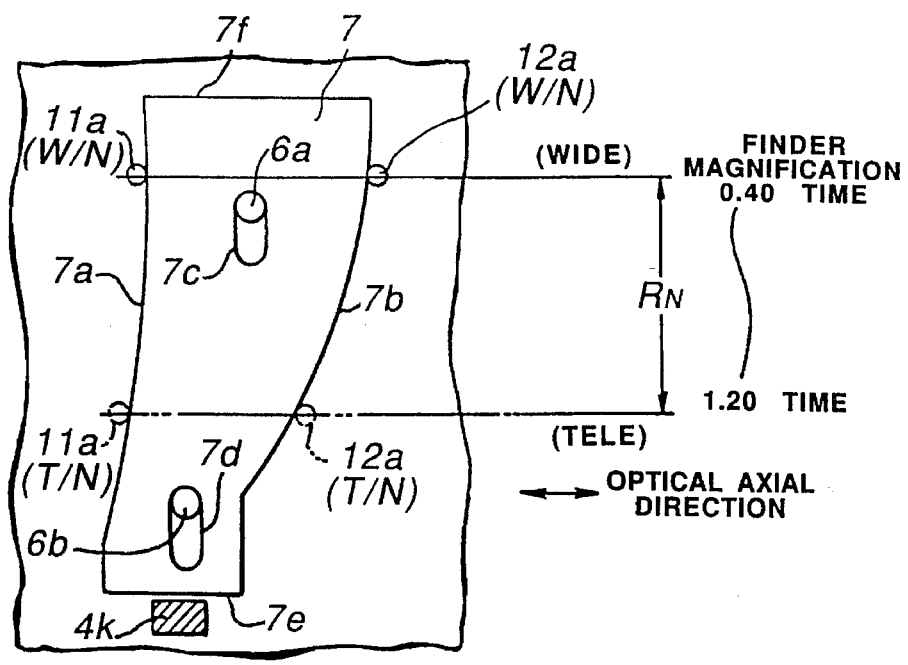

The finder cam 7 is held by way of a relative position holding mechanism, described later, to be switchable to two relative positions corresponding to the N photographing and P photographing modes with respect to the cam ring 6. The relative positions are switched with each other by pushing end surfaces 7e and 7f of the finder cam 7 against stoppers 4i and 4k of the camera body 4 and displacing the holding positions as shown in FIGS. 13 and 14. On the outer periphery of the cam ring 6, a flexible board 25 of an encoder pattern to which an armature 26 is slidably fitted is arranged.

The finder unit comprises a finder body 8, a guide shaft 29 supported by the finder body 8, finder lens F frames 11 and 12 slidably supported by the guide shaft 29, finder magnification varying lenses 11b and 12b held by the F frames 11 and 12, a visual field mask operating switching lever 13 (see FIG. 10) forming a switching mechanism of a visual field frame, an F frame spring 14 hung on each of the F frames 11 and 12, a porro-prism not illustrated, a visual field mask and an eyepiece lens. The aforesaid finder body 8 is fitted to the camera body 4.

The photographing picture size switching mechanism part is arranged in the front surface part of a standard mask opening part 4d of the camera body 4 and consists of photographing picture size switching movable masks 1 and 2 and a P ring 3 operating masks 1 and 2. The masks 1 and 2 can be moved to the respective picture size switching positions by respective guide pins 1b and 2b guided in a straight advancing guide groove 4c of the camera body 4.

When a photographed picture size is switched, the P ring 3 is rotated to a predetermined position by pushing an operating arm 3f by the contact surfaces 6c and 6d of the cam ring 6 by making the zoom motor 10a a driving source. Then, the P ring 3 is moved to move the aforesaid masks 1 and 2 to the respective picture sizes switching positions through driving pins 1a and 2a of the masks 1 and 2 fitting into incision grooves 3a and 3b provided on the inner periphery.

The operation of the zoom camera formed in the first embodiment will be explained. First of all, the cam ring 6 is rotated by the zoom motor 10a based on a zoom controlling signal to make a zooming operation of the camera. Also based on the zooming operation, the F frames 11 and 12 of a finder unit are driven in the axial direction by the finder cam 7 to zoom in/out a finder image.

The photographed picture sizes are switched through the cam ring 6 at the zoom motor 10a by rotating the P ring 3. However, when the N photographing mode is switched, the P ring 3 is rotated counter-clockwise (CCW, hereinafter) to vertically open the masks 1 and 2 to make an image-formed part opening corresponding to an N size. When the P photographing mode is changed, the P ring 3 is rotated clockwise (CW, hereinafter) to move the masks 1 and 2 to approach each other to make an image-formed part opening corresponding to a P size. A driving arm 3g moving with the switching operation presses an operating arm 13a of a switching lever 13 for operating visual field mask of the aforesaid finder unit and gives a finder visual field frame corresponding to the aforesaid photographed picture size.

Further, the relative positions of the cam ring 6 and finder cam 7 are switched in response to the switching of the aforesaid photographed picture size. That is, when the cam ring 6 is rotated CCW or CW, the finder cam 7 is respectively butted against the stoppers 4i or 4k. If the cam ring is further rotated, the relative position with the cam ring 6 and finder cam 7 changes. Therefore, the regions in which the cam pins 11a and 12a of the F frames 11 and 12 of the finder unit are in sliding contact with the cam surfaces 7a and 7b of the finder cam 7 will be different. Thus, the first region will be used at N photographing and the second region will be used at P photographing. The first and second regions are formed as continued on the cam surfaces 7a and 7b.

Figure 8A:
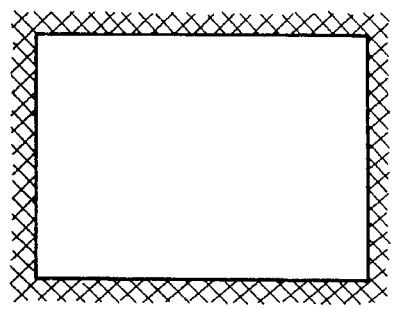
FIGS. 8(A), 8(B) and 8(C) are elevational views showing a finder visual field frame.
Figure 8B:
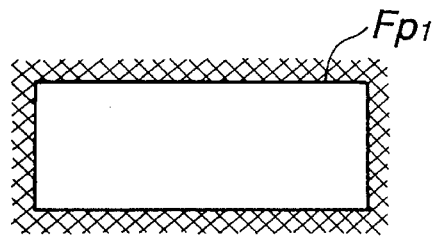
Figure 8C:
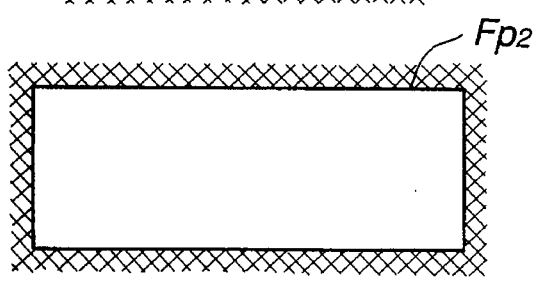

As in the above, described first embodiment, the finder visual field frame sizes switched in response to the switching of the photographed picture sizes in the N photographing and P photographing, at the same time, the value of the varying magnification of the finder is changed and particularly, at the time of the P photographing, the magnification can be elevated to prevent the finder from becoming hard to see. For example, as shown in FIGS. 8(A)–8(C), the finder visual field frame at the time of the P photographing will not be the conventional visual field frame Fp1 as shown in FIG. 8(B) but will be the visual field frame Fp2 shown in FIG. 8(C). The finder visual field frame shown in FIG. 8(A) will be the visual field frame at the time of the N photographing.

Figure 2A:
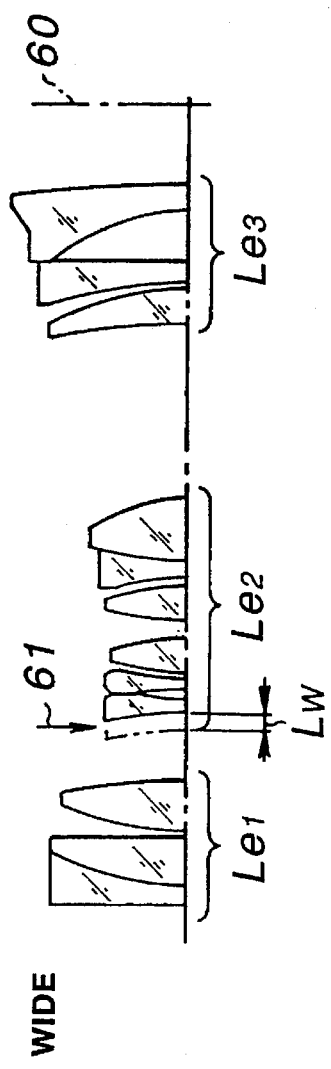
FIGS. 2(a), 2(b) and 2(c) are side elevational views showing a photographing optical system.
Figure 2B:
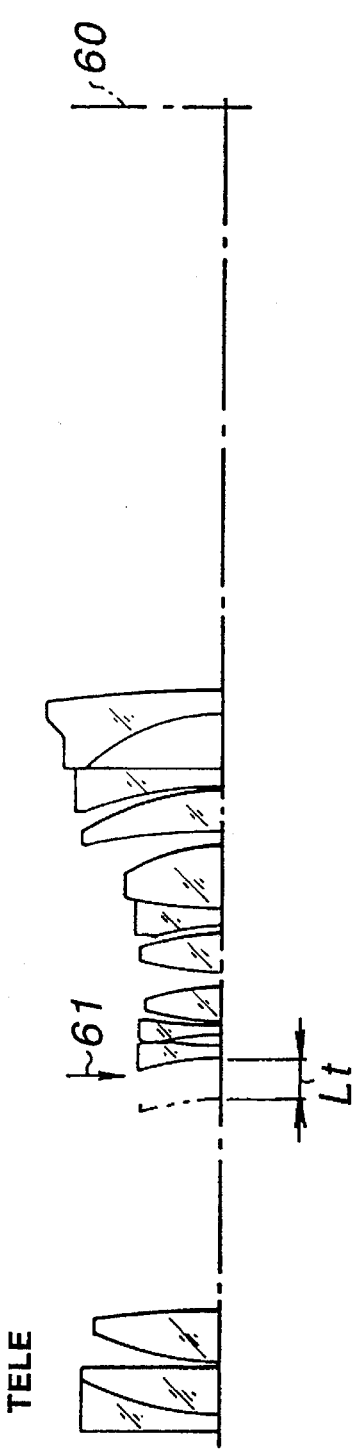
Figure 2C:
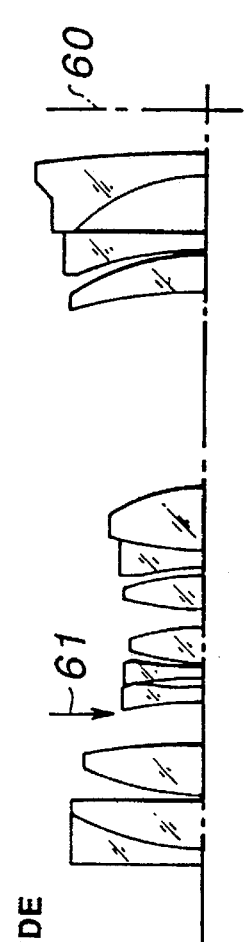

It is already mentioned that FIGS. 2(a) and 2(c) show the photographing optical system of the first embodiment. Next, in FIG. 3, the internal structure not illustrated will be briefly explained.

Figure 12:
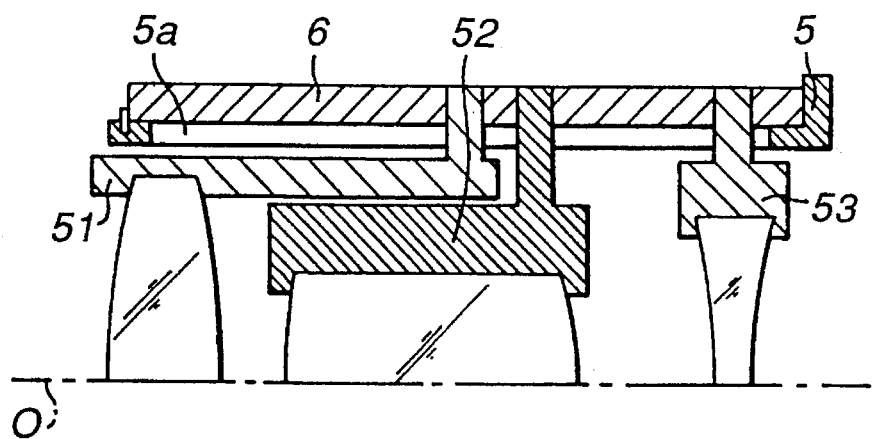

FIG. 12 is a diagram in which the rotatable cam ring 6 is arranged on the outer periphery of the fixed frame 5. A straight groove 5a is provided on the fixed frame 5. First group frame 51, second group frame 52, and third group frame 53 are supported by the straight grooves 5a and the cam groove of the cam ring 6. The cam grooves and straight groove are provided in approximately three equal parts in the circumferential direction.

Figure 11:
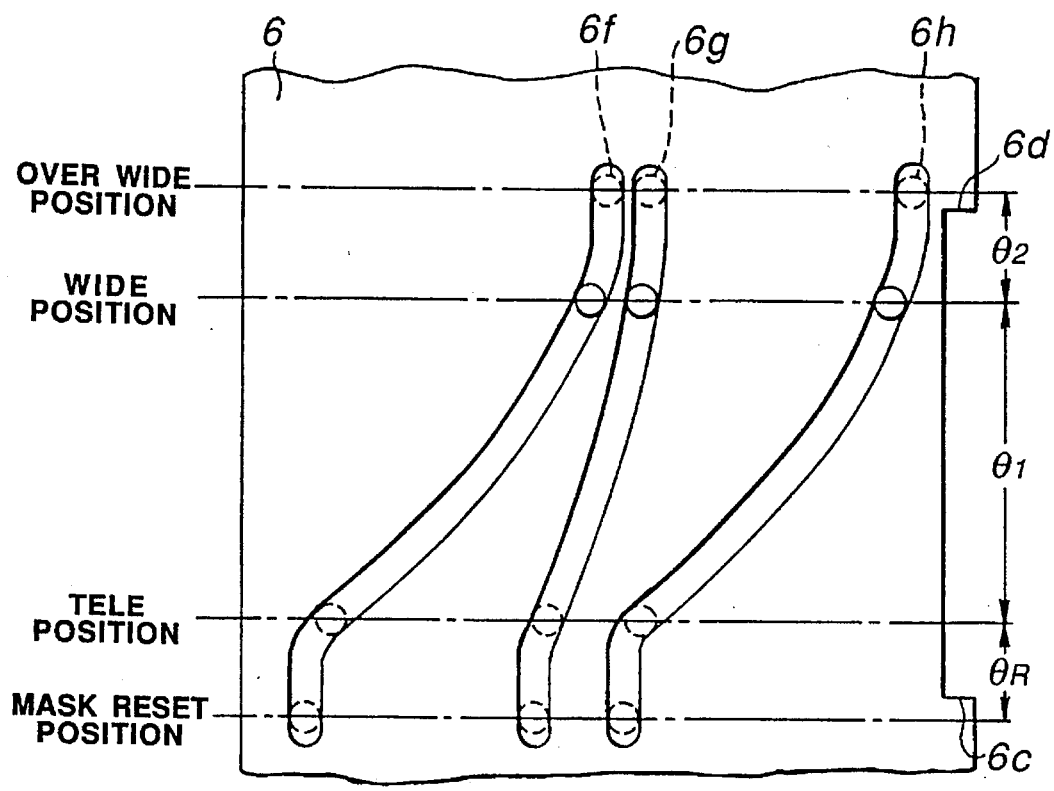

FIG. 11 shows a developed view of the cam part of the cam ring 6. When it is the wide state, pins 6f, 6g and 6h of each group are positioned on the chain line labelled WIDE POSITION in FIG. 11. The cam ring 6 can be zoomed in/out from the wide state to the tele state within the rotary range θ 1. The over wide position is arranged on an extension line of the cam ring 6 within an ordinary rotating range so as to form an over wide optical system by rotating over an angle θ 2 from the wide end.

In the description above, the inside of a barrel frame is conceptually explained. The second group frame contains a motor and sector group for regulating a shutter mechanism and a motor and moving mechanism regulating a focusing mechanism. The wide state of the optical system is set to f=35 mm, tele state f=105 mm and over wide state f=28 mm.

Figure 9A:
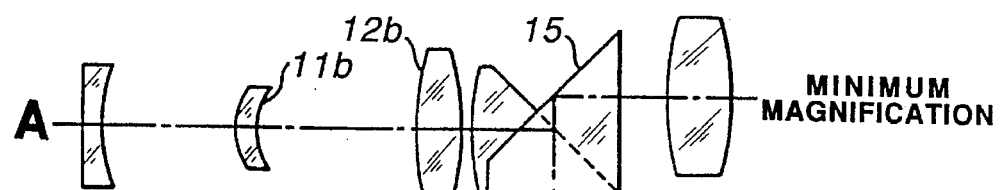
Figure 9B:
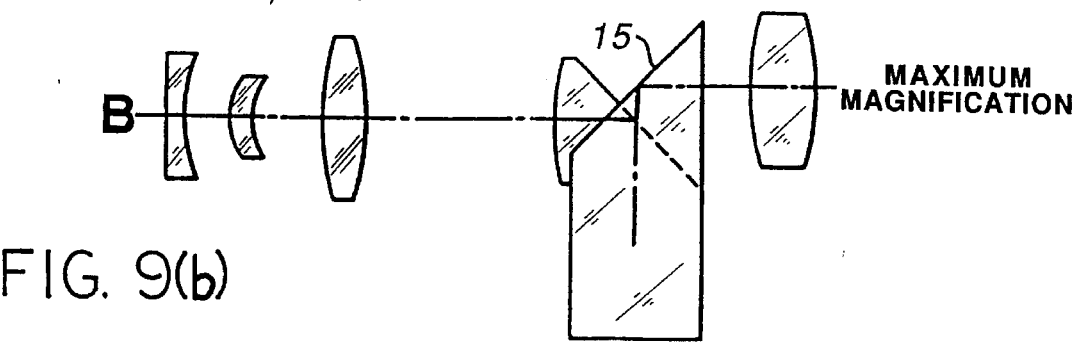

FIG. 9(A) is a diagram of the finder optical system and shows a real image type finder in which the second and third groups are magnification variable lens groups. In FIGS. 9A and 9B are the states of the finder optical systems at a minimum magnification and maximum magnification, respectively. The minimum magnification is 0.40 time and the maximum magnification is 1.56 time. However, in response to the switching of the picture size, a using range in the magnification is limited. Because 35–105 mm is used, 0.40–1.20 time is used in the normal mode, and 0.42–1.56 time is used in the panoramic mode. Therefore, the aforesaid visual field of Fp2 shown in FIG. 8(C) is obtained.

Next, the structure of the optical system of the aforesaid finder unit will be explained on the basis of FIG. 10. The finder unit is mainly formed of the finder optical system lens, a porro-prism 15, a visual field mask 16 which is a visual field frame switching mechanism and the visual field mask operation switching lever 13 for operating a visual field mask.

Figure 10:
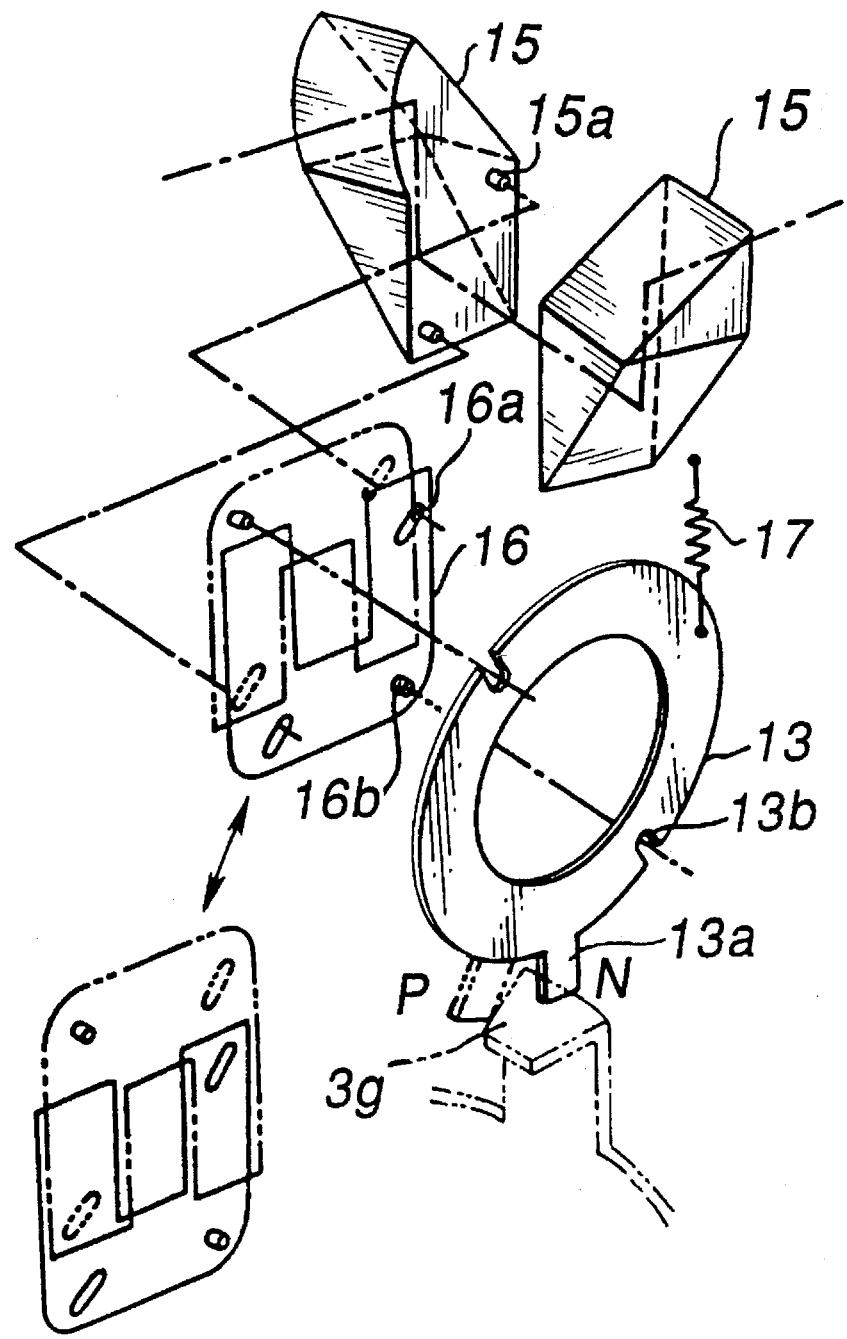

As shown in FIG. 10, the porro-prism 15 having four reflecting surfaces is separated into two bodies on the right and left and the image forming surface of the finder image forming system is positioned intermediate between the two bodies. The finder visual field mask 16 consists of two sheets. Slot parts 16a engaged with projections 15a of the porro-prism 15 and are slidably held. The switching lever 13 is rotatably held by the finder body 8 (see FIG. 3) and energized in the CCW direction by a visual field spring 17.

When the P ring 3 shown in FIG. 3 is rotated in the CW direction by the P photographing switching operation, the driving arm 3g of the P ring 3 pushes the operating arm 13a of the switching lever 13 to rotate the switching lever 13 in the CW direction against the force of visual field spring 17. At this time, the groove 13b of the switching lever 13 engages with the projection 16b of the visual field mask 16, therefore, the visual field mask 16 moves in the lengthwise direction of the slot 16a and the visual field frame sizes are switched.

Next, the picture size switching mechanism of the first embodiment will be explained with reference to FIGS. 4–7.

Figure 4:
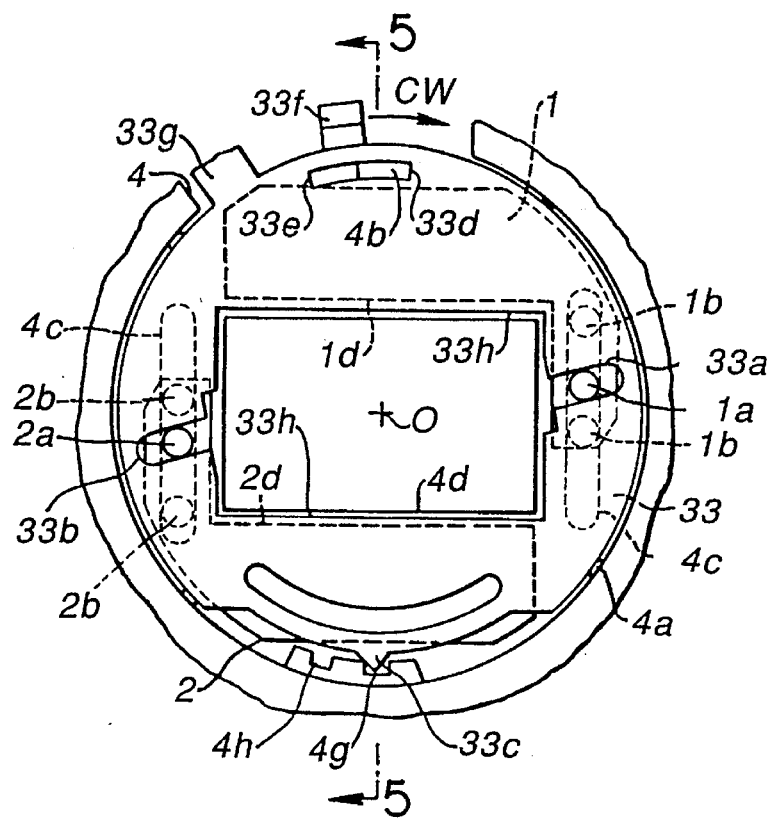
Figure 5:
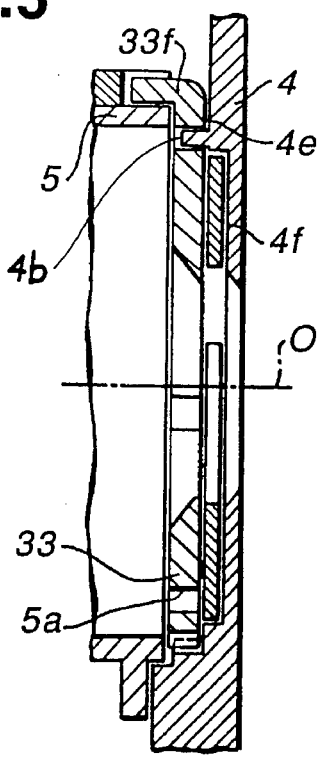
Figure 6:
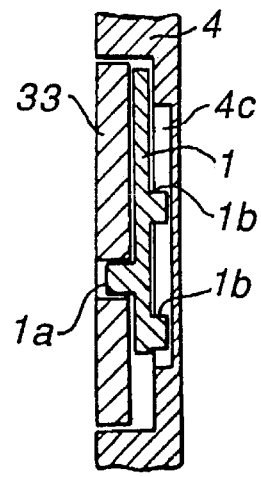
Figure 7:
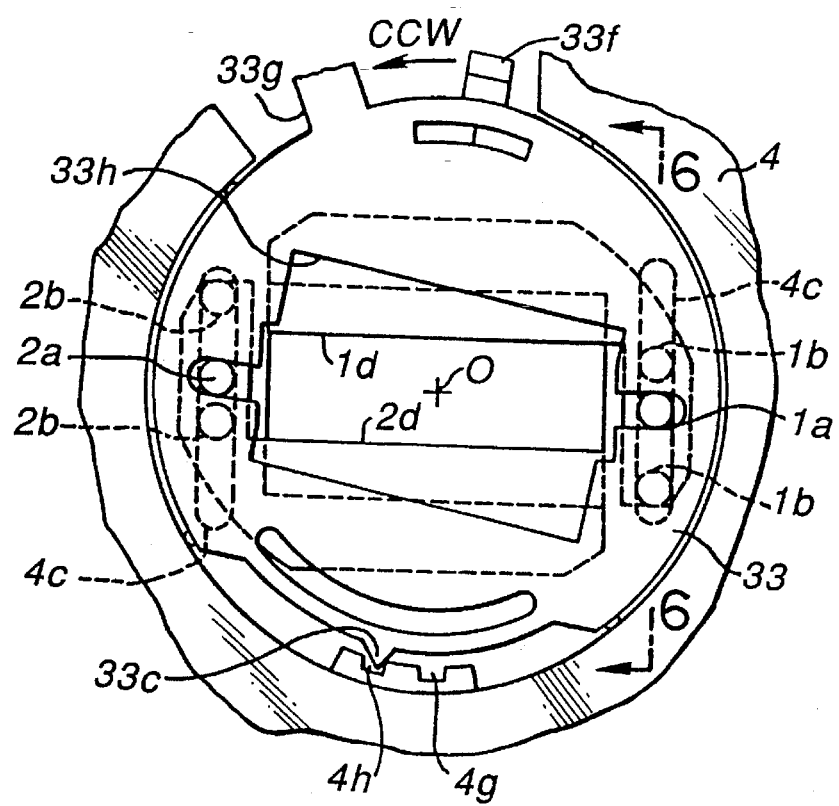

FIG. 4 shows the details of the ring part in FIG. 3. A P ring 33 is further details of the P ring 3 in FIG. 3. Other formations are equal to those shown in FIG. 3. The section 5—5 in FIG. 4 is shown in FIG. 5. The section 6—6 in FIG. 7 is shown in FIG. 6. FIG. 4 is a state looking at the ring part from an object at the normal mode. FIG. 7 is the state of the panoramic mode.

The aforesaid picture size switching mechanism part is arranged between the surface 4f of the standard mask opening part 4d of the camera body 4 and the end surface 5a of the fixed frame 5. The aforesaid switching mechanism is formed of the masks 1 and 2 determining a real photographed picture size at the time of P photographing, a P ring 33 switching the mask position and a standard mask opening part 4d of the camera body 4 determining the N size of a real picture at the time of N photographing. The P ring 33 and the masks 1 and 2 are againt movement in the axial direction by the end surface 5a of the fixed frame 5 and a P ring receiving surface 4e of the camera body 4. The P ring 33 is rotatably held by an outer peripheral receiving part 4a. The rotation of the P ring 33 is driven by pressing an operating arm 33f by the contact part 6c or 6d of the cam ring 6.

The masks 1 and 2 have pins 1b and 2b for guiding at moving and fitted into the straight guiding groove 4c.

Driving pins 1a and 2a provided in the masks 1 and 2 are fitted into the incised grooves 33a and 33b of the P ring 33. Further, the P ring 33 has contact surfaces 33e and 33d with which the stopper 4b of the camera body 4 is in contact to determine the N and P photographing positions. A clicking projection 33c of the P ring 33 fits into the clicking groove 4g or clicking groove 4h of the camera body 4. The clicking projection has a clicking holding force and its position is determined.

A leaf switch (not illustrated) for detecting a picture size which is switched off at the N photographed position and on at the P photographed position is provided near the outer periphery of the aforesaid P ring 33.

The operation of the picture size switching mechanism will be explained.

In the N photographing mode state in FIG. 4, the masks 1 and 2 are separated from each other and positioned outside the range of the standard mask opening part 4d of the camera body 4. Therefore, the N size (normal size) of a real picture is determined by the opening part 4d. Also, in this state, the contact surface 33d of the P ring 33 contacts the stopper 4b and the clicking projection 33c fits into the clicking groove 4g. When the contact surface 6d of the cam ring 6 contacts operating arm 33f and the P ring 33 is rotated in the CW direction, the incised grooves 33a and 33b of the P ring 33 drives the driving pins 1a and 2a of the masks 1 and 2, so that the masks 1 and 2 move downward or upward along the straight guide groove 4c of the camera body 4. Further, when it is rotated, the contact surface 33e contacts the stopper 4b, the P ring 33 is positioned in the P photographing mode position shown in FIG. 7 and the clicking projection 33c fits into the clicking groove 4h. In this state, the masks 1 and 2 approach each other and form areas of the real picture size of the P size (panoramic size) by the end surfaces 1d and 2d, respectively.

In order to return the N photographing mode state again, the operating arm 33f of the P ring 33 is pushed to the CCW direction by the contact surface 6c of the cam ring 6 and rotated, so that the state in FIG. 4 can be returned. Also, in this embodiment, the shape of the opening part 33h in the center of the P ring 33 has necessary minimum dimensions no smaller than that of the standard mask opening part 4d of the camera body 4. This shields unnecessary light as much as possible.

The magnification varying mechanism of the finder optical system operatively connected with the zooming and picture size switching operations of the zoom camera of the first embodiment will be explained.

Figure 15:
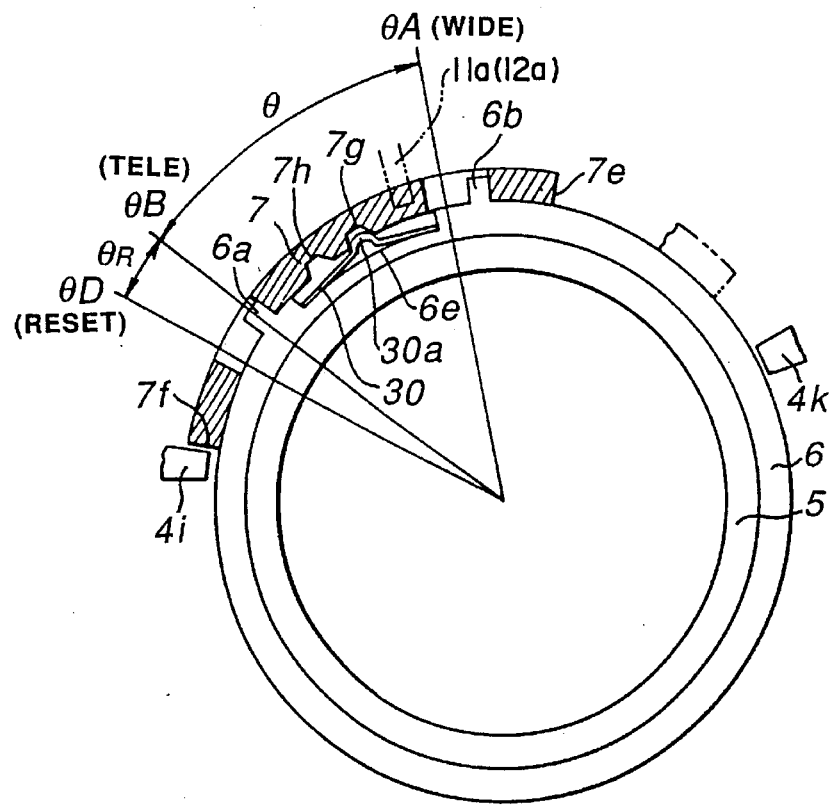
Figure 16:
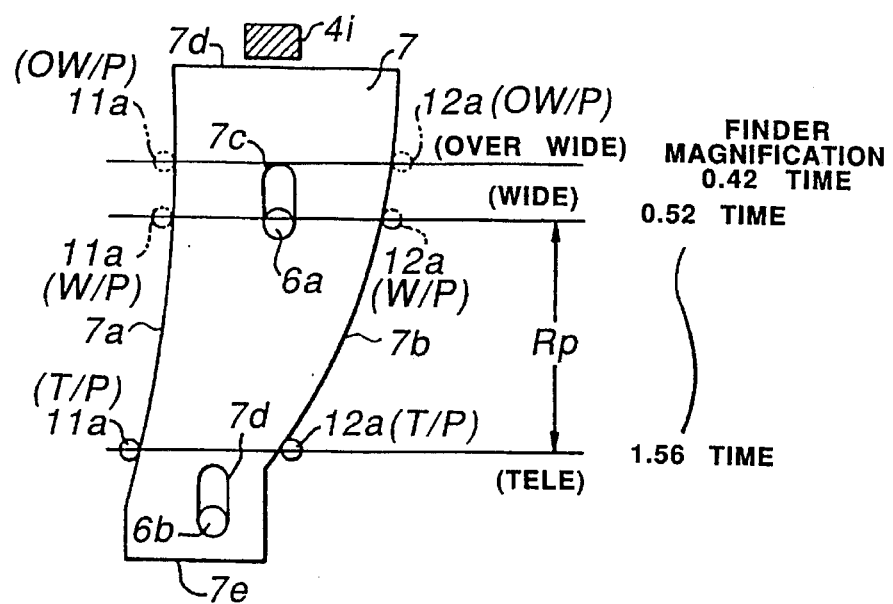

FIGS. 13 and 14 show longitudinal sectional views of the finder cam 7 and the cam ring 6 at the wide state of the N photographing mode and their developed views. FIGS. 15 and 16 show longitudinal sectional views at the tele state of the P photographing mode and its developed views. The rotatable finder cam 7 is held and arranged through the relative position holding mechanism described later by either of two positions on the outer periphery of the cam ring 6. The finder cam 7 and cam ring 6 are rotated as a unit body in the zooming rotating range θ of the cam ring 6 under its holding state.

In FIGS. 11 and 13, the rotating angle θ 1 of the cam ring 6 is an angle represented by the guide pin 6a within the range of the wide position angle θ A to the tele position angle θ B.

As shown in FIGS. 13 and 14, in the N photographing mode, the positions of the cam pin 11a of the F frame 11 and the cam pin 12a of the F frame 12 of the finder contact the cam surfaces 7a and 7b of the finder cam 7, respectively, by the energizing force of the F frame spring 14 (see FIG. 3). The cam pin position shown by (W/N) represents a cam pin position in the wide state at the time of N photographing.

When the cam ring 6 rotates to the tele position by zooming operation, the cam pins 11a and 12a of the F frames 11 and 12 slide while these pins contact the cam surfaces 7a and 7b of the finder cam 7 and then, reach the cam pin position shown by (T/N). The range from the (W/N) position to (T/N) position of the pins 11a and 12a is the first region RN of the finder cam 7 used at the time of N photographing. The finder magnification is 0.40–1.20 time.

In order to switch the N photographing mode in FIG. 13 to the P photographing mode in FIG. 15, the cam ring 6 in FIG. 3 is rotated by an angle θ 2 over the wide end to the switching rotating position (rotating position of the guide pin 6a) θ C to the P photographing mode. At this time, the end surface 7e of the finder cam 7 contacts the stopper 4k of the camera body 4 and further, presses the stopper, so that the finder cam 7 is rotated and moved almost by an angle θ 2 with respect to the pin 6a against the holding force of the aforesaid relative position holding mechanism and positioned in the relative position of the P photographing mode state. However, this state is a wide state.

FIGS. 15 and 16 show a tele state of the P photographing. When the cam ring 6 is rotated to the wide area, the cam pins 11a and 12a of the F frames 11 and 12 move from the position indicated by (T/P) to the position indicated by (W/P) while the cam pins are in contact with the cam surfaces 7a and 7b. This range is the second region Rp of the finder cam 7 which can be zoomed in/out at P photographing. The finder magnification is 0.52–1.56 time.

At the time of P photographing, further rotation can move it to an over wide state of 0.42 time. As clearly shown in FIG. 14, the second region Rp of the finder cam 7 is formed by extending the first region RN.

In order to return the N photographing state again, as shown in FIG. 15, the cam ring 6 is rotated over the tele state by a switching angle θ R of N photographing, that is, it is rotated to the rotating position θ D with respect to the position of the pin 6a. By this operation, the end surface 7f of the finder cam 7 contacts the stopper 4i of the camera body 4. Further, the finder cam 7 rotates in the CW direction relative to the cam ring 6 and is positioned in the relative position at the N photographing state. However, a position at that time is a tele position. The state shown in FIG. 13 is a state that the cam ring 6 has been driven to a wide position.

Thus, the finder of the camera of the first embodiment changes the cam using a region connected with switching photographed picture sizes. Therefore, this can make the finder easy to see.

Next, the relative position holding mechanism of the aforesaid cam ring 6 and finder cam 7 will be explained in detail.

The aforesaid holding mechanism of this embodiment uses a clicking stop mechanism. As shown in FIGS. 13 and 15, clicking grooves 7g and 7h are formed in the finder cam 7. A recess 6e for holding the clicking spring 30 is formed in the cam ring 6. Further, a convex projection 30a for dropping into the clicking grooves 7g and 7h is formed in the clicking spring 30. The finder cam 7 not illustrated is regulated in the radial direction so as to be slidable on the outer periphery of the cam ring 6 and to be rotatable in the periphery direction along the guide pins 6a and 6b.

In FIG. 13, the projection 30a of the clicking spring 30 has dropped in time clicking groove 7h, so that, in this state, the cam ring 6 and finder cam 7 can rotate as a unit body. In noticing the guide pin 6a, it is found that, when the pin 6a is moved in the range of an angle θ 1, the wide and tele states in the N photographing state can be set.

From FIG. 13, when the cam ring 6 is rotated in the CW direction by an angle θ, the projection 30a drops into the clicking groove 7g after the end surface 7e of the finder cam 7 contacts the stopper 4k of the camera body 4 and the fitted positions can be switched. By This switching operation, the relative position relation between the cam ring 6 and the finder cam 7 becomes a cam setting state for P photographing. After that, the position of the guide pin 6a of the cam ring 6 is returned from θ C to θ A, so that the wide state at P photographing is set.

Further, if the aforesaid cam ring 6 is held to θ C as it is, pictures at the over wide state can be taken.

In the same manner, in the tele state of the P photographing in FIG. 15, when the cam ring 6 is rotated in the CCW direction by an angle θ R, the end surface 7f of the finder cam 7 contacts the stopper 4l of the camera body 4 and the cam ring 6 is further rotated, therefore, the finder cam 7 rotates relative to the cam ring 6. Then, the projection 30a of the clicking spring 30 is switched from the clicking groove 7g to drop into the clicking groove 7h, so that the relative position relation between the cam ring 6 and finder cam 7 become a cam setting state of the N photographing mode. After that, when the cam ring 6 is rotated in the reverse direction by θ R, the N photographing tele state will be made.

Figure 17:
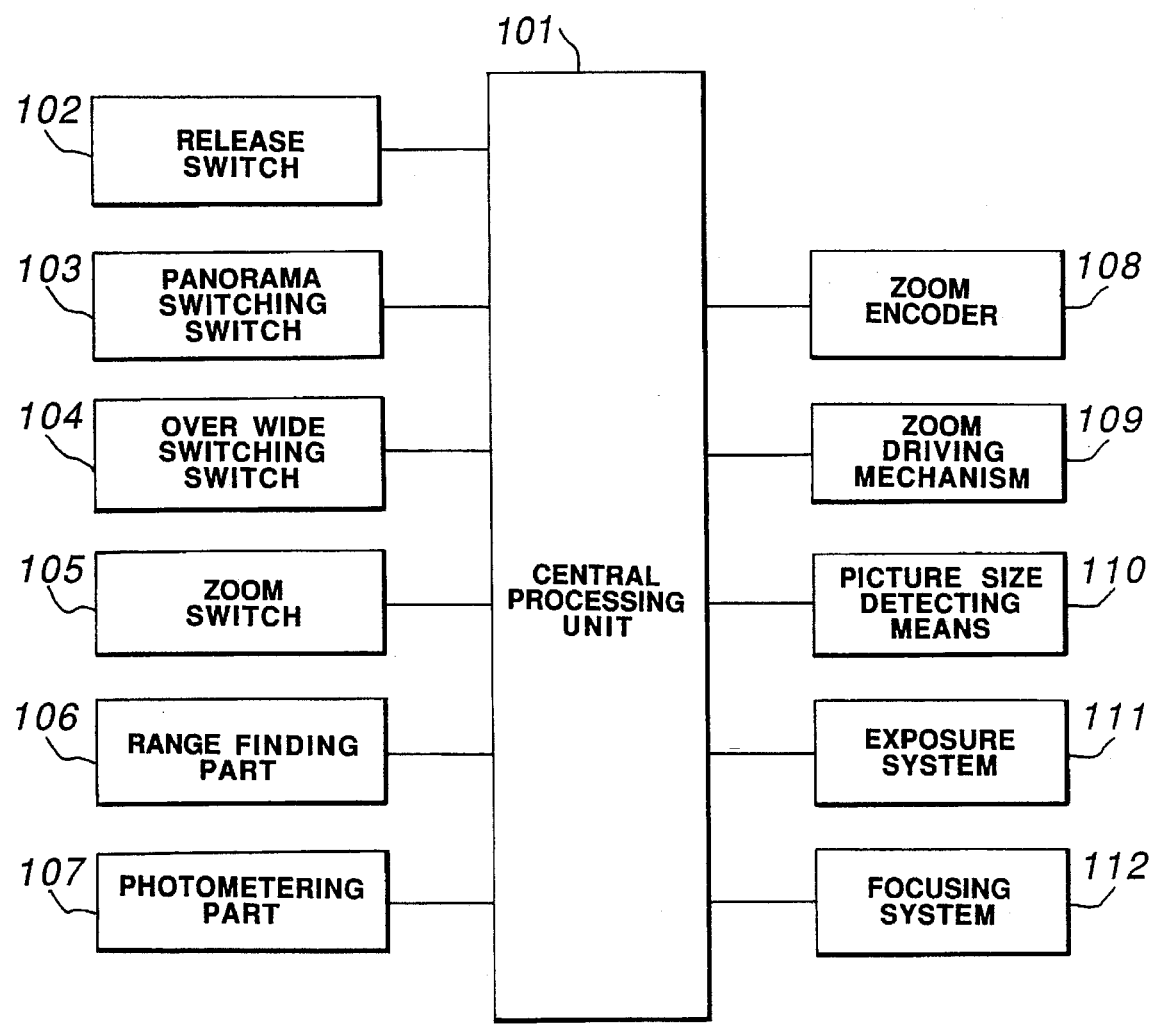

Next, the case showing the main part of the electric construction will be explained in reference to the block diagram shown in FIG. 17.

The zoom camera of this embodiment is basically a known automatic camera. The main part of the camera is formed of a central processing unit 101 (CPU 101, hereinafter) for driving and controlling the whole camera, a release switch 102 being switched on in connection with the press of a release button (not illustrated) provided on the outside the zoom camera, a panorama switching switch 103, provided on the outside the camera, for selecting a panoramic mode (a range between a wide state and tele state). an over wide switching switch 104, provided on the outside the camera, for designating an over wide state as a photographing region selecting switch for selecting a photographing optical system in a specific position, a zoom switch 105, formed of a button and lever (not illustrated), for controlling a zoom driving mechanism 109 by transmitting an operating signal to the CPU 101, a range finding part 106 for measuring necessary data of an object by measuring distance and photometering and for transmitting the data to the CPU 101, a photometering part 107, a zoom encoder 108 for monitoring the zoom driving mechanism 109 and transmitting the information of the zoom driving mechanism 109 to the CPU 101, picture size detecting means 110 for detecting photographed picture sizes, an exposure system 111 controlled by the CPU 101 to operate and a focusing system 112. Each of the aforesaid parts is connected to the CPU 101.

As mentioned above, the photographed picture sizes are switched by cam ring force in the case of the first embodiment. The aforesaid zoom driving mechanism 109 is controlled by the input of the panorama switching switch 103 and over wide switching switch 104.

Figure 18:
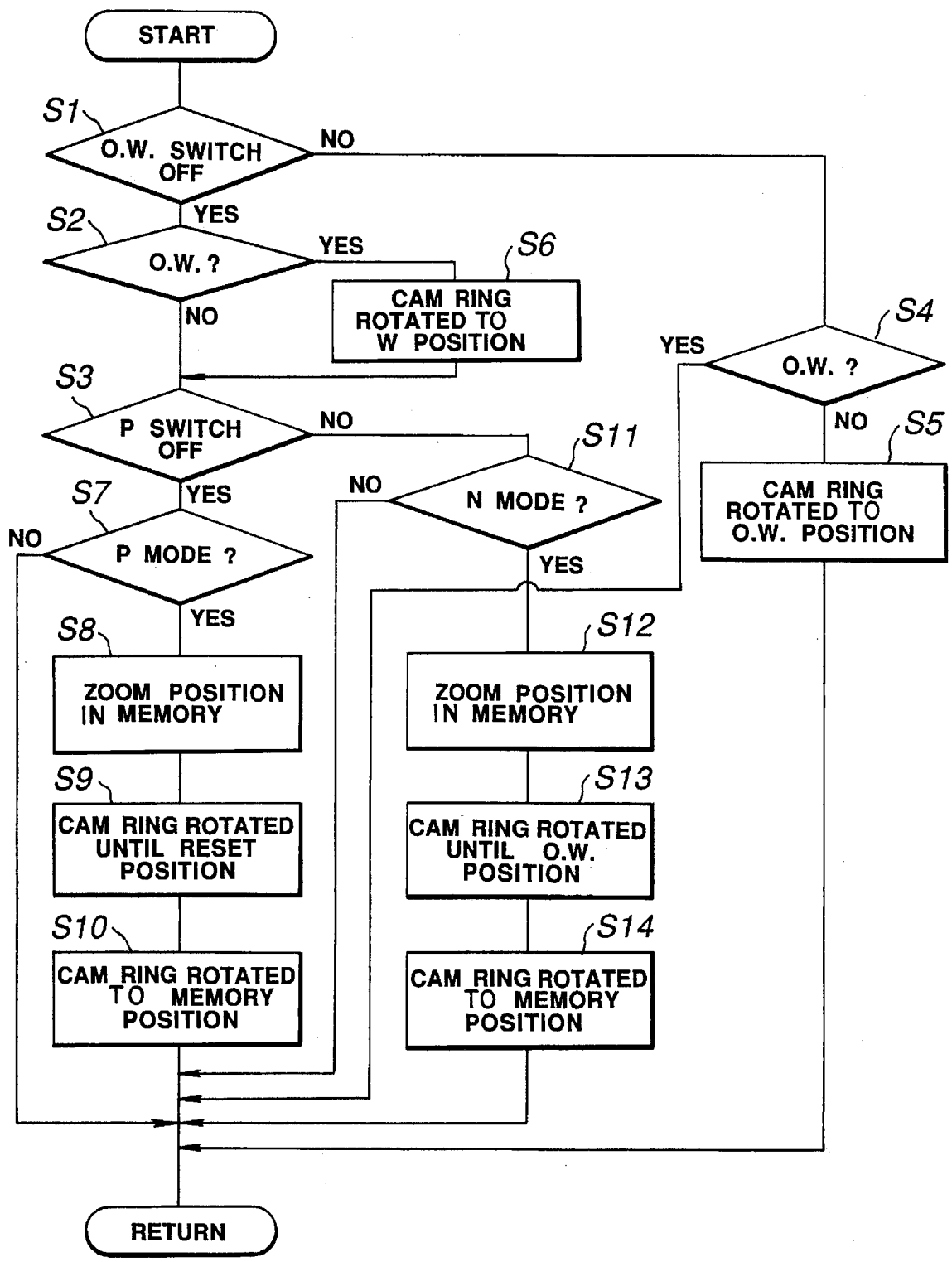

The photographed picture size switching operation in the zoom camera having the aforesaid structure in this embodiment will be explained using the flowchart shown in FIG. 18 as the operation of the CPU 101.

First of all, the CPU 101 identifies the setting state of the aforesaid over wide switching switch (O.W. switch, hereinafter) 104 (step S1). If the O.W. switch 104 is on, the process jumps to a step S4. If the actual zoom position is not positioned in an over wide (O.W.) state, the cam ring 6 rotates and stops at the over-wide position (step S5). In the step S4, if the over wide state has been already preset, no driving is needed. Thus, the process is returned.

In the above step S1, if the O.W. switch 104 is off, the actual zoom position is identified (step S2). If the switch 104 is set to be the over wide state, the cam ring 6 is rotated to a wide position (W position) (step S6) and then, the process proceeds to a step S3. Also, in the aforesaid step S2, if the over wide state is not set, the setting state of the aforesaid panorama switching switch (P switch, hereinafter) 103 is identified (step S3). If the P switch 103 is off, that is, a normal mode (N mode, hereinafter) is set, it is identified whether the actual mask state is a panoramic mode (P mode, hereinafter) or not at a step S7. In the step S7, if the actual mask state coincides with the state of the P switch 103, that is, it is the N mode instead of P mode in this case, the process can proceed to "return". However, if the mode setting is different from the actual state, that is, it is the P mode in this case, the following operation is required.

First of all, the P mode is canceled in a step S8. However, when a mask state is a panoramic state, the step S8 is transferred from the aforesaid step S7 and it is necessary to cancel the mask state from the panoramic state. If a general using state is considered, a mode is changed in a focal length which indicates that many cases desire to photograph in the focal length.

Accordingly, the first embodiment is formed to be able to return the zoom state at changing a mode again after masks are switched. That is, the actual zoom position is stored at the aforesaid step S8. By a step S9, the cam ring 6 is rotated to a reset position and stopped on the basis of the aforesaid mechanism. In this state, the switching of the mask states and switching of a visual field have been completed. Then, by a step S10, the cam ring 6 is reversely rotated and returned to the zoom position stored in a memory by the aforesaid step S8. As a result, a photographer can take a picture at the focusing state before changing a mode.

On the other hand, when the aforesaid P switch 103 is on in the step S3, that is, when the P mode is set, it is identified whether the actual mask state is the N mode or not at a step S11. In the step S11, if the actual mask state coincides with the state of the P switch 103, that is, it is the P mode instead of the N mode, the process can proceed to "return". However, if mode setting is different from the actual state, that is, if the N mode is set, the following operation is required in the same manner as mentioned above.

Although the aforesaid step S8 to step S10 sequence indicates the case in which the panoramic state is changed to the normal state, the opposite way of thinking is the same as the aforesaid. In the case of the N mode in the aforesaid step S11, the process proceeds from the zoom position memory to mask state at the O.W. position and finder switching and also proceeds to the cam ring rotated to the finder switching memory position in turn in the step S12 to step S14.

If the first embodiment is used as the aforesaid, a picture having angle wider than the ordinary photographing range can be obtained at panoramic photographing; however, it is not necessary to make the photographing optical system bigger. Also, a photographed picture size switchable camera capable of automatically switching picture sizes only by switching modes can be obtained.

It is mentioned that the over wide optical system is formed by narrowing an Interval between the first lens group and second lens group in the photographing optical system of the first embodiment as shown in FIG. 2. If it is intended to widen a wide angle, an amount of movement for focusing of the second lens group might not be secured depending on photographing optical systems. Nevertheless, when a general photographing scene is considered, most scenes that a photographer desires to take as a wide angle panoramic picture are scenery and many people. At the time of panoramic photographing of wide angle, an object distance is a relatively long distance. Thus, as in the first embodiment, it might not be a big obstacle that a photographing optical system does not have the shortest object distance of 0.8 m like the state of the photographing optical system shown in FIGS. 2(a) and 2(b) at the time of the over wide position.

Generally, in a case when the photographing optical system of the first embodiment is used, an interval between the first lens group and second lens group narrows and there is a high possibility that lenses interfere with each other when a short range is focused. If this is considered, an over wide photographing range may be set from 3m to ∞.

Further, even if the range is set from 3m to ∞, when there is need of taking a picture within a shorter range, for example, 3m or less, an open aperture F No. of a wide angle lens may be controlled using the characteristic in which a depth of field becomes larger by stopping down the wide angle lens. This is because of many occasions to take pictures in relatively bright outdoors at wide angle panoramic photographing. Thus, even if the moving amount of a photographing lens is not secured, an over wide state at short range can be made.

The relation between the photographing range and open aperture F No. is shown in Table 1 as follows.

TABLE 1

|  | Photographing range | Open aperture F No. |
| --- | --- | --- |
| WIDE | 0.8–∞ | 4.5 |
| TELE | 0.8–∞ | 6.5 |
| OVER WIDE | 3.0–∞ | 6.5 |

Next, the second embodiment of this invention will be explained.

In the second embodiment, as mentioned later, a type in which a part of a zooming range is a region for the exclusive use for panorama is described so as not to cause a problem even if a performance of the range which is not used deteriorates.

In the first embodiment mentioned above, a mechanism which uses only one point in the over wide position of f=28 mm is indicated as against a lens for photographing in which f=35–105 mm is an ordinary photographing range. However, it is more useful for a photographer to be able to take a picture within the range between 28 mm and 35 mm.

Accordingly, if edges of a luminous flux part are not used at the time of panoramic photographing, for example, a range of f=35 mm or less is made to be usable only at the time of a panoramic mode, so that a photographing optical system much smaller than the photographing optical system having an ordinary range f=28–105 mm can be obtained even though the system is not small as the photographing optical system of the first embodiment.

Figure 19:
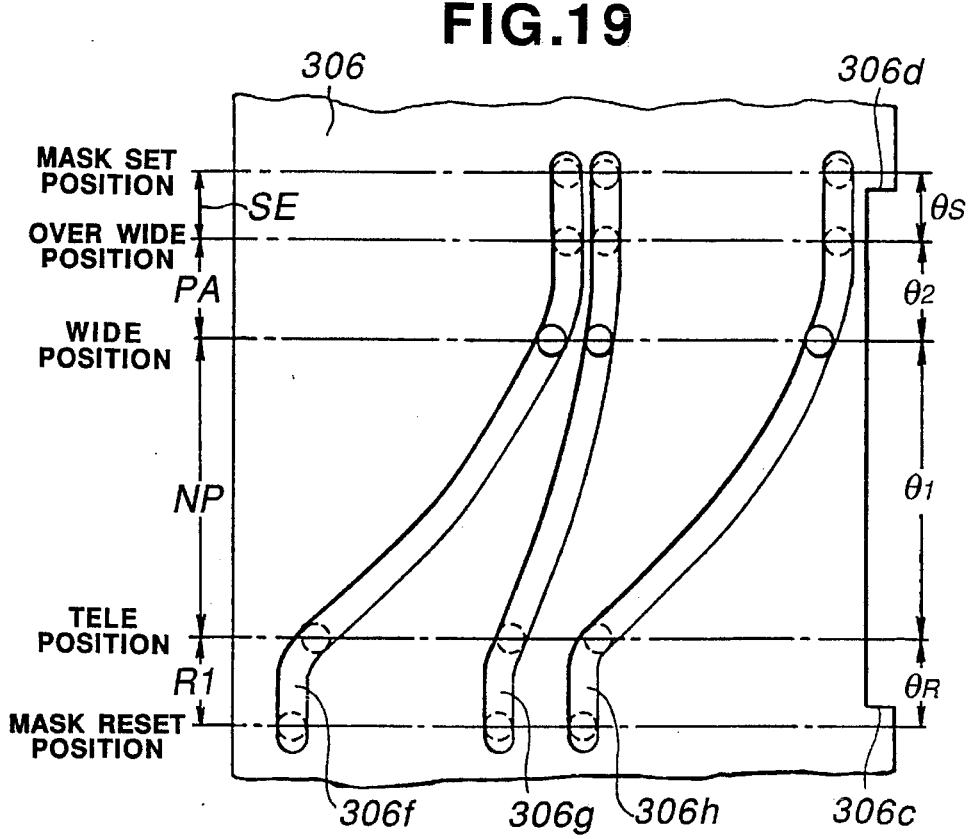
FIGS. 19–21 illustrate a second embodiment of the present invention.

FIG. 19 is a developed view of a cam ring of a zoom camera of the second embodiment. The photographing optical system not illustrated is formed of three groups as shown in the first embodiment. Also, a frame outline, switching mechanism of a panoramic mask part, and switching mechanism of a finder part are equal to the aforesaid embodiment.

Here, a cam ring 306 functions in a manner similar to the cam ring 6 in FIG. 11. The cam ring 306 is provided with cams 306f for the first group, 306g for the second group and 306h for the third group which move the lens frames of the first to third groups, respectively. The cam ring 306 is moved in the up and down directions in FIG. 19 by a driving system (not illustrated). The region of the cam ring 306 is classified as follows.

An ordinary photographing region corresponds to θ 1. In the region, normal and panoramic picture sizes can be used. θ 2 adjacently provided to θ 1 is an exclusive range for panorama, which is a region of f =28–35 mm in this case. In the aforesaid first embodiment, a mask switching operation completes at the over wide end corresponding to the end of θ 2; however, a region θ S for setting a panorama normal mask and a region θ R for resetting a mask are provided in order to use the whole range θ 2 for photographing in this embodiment.

In FIG. 19, contact surfaces 306c and 306d which are not especially described are equipped, for example, for rotating an operating arm 3f of the P ring 3 (33f of the P ring 33) in the same manner as the first embodiment.

Figure 20:
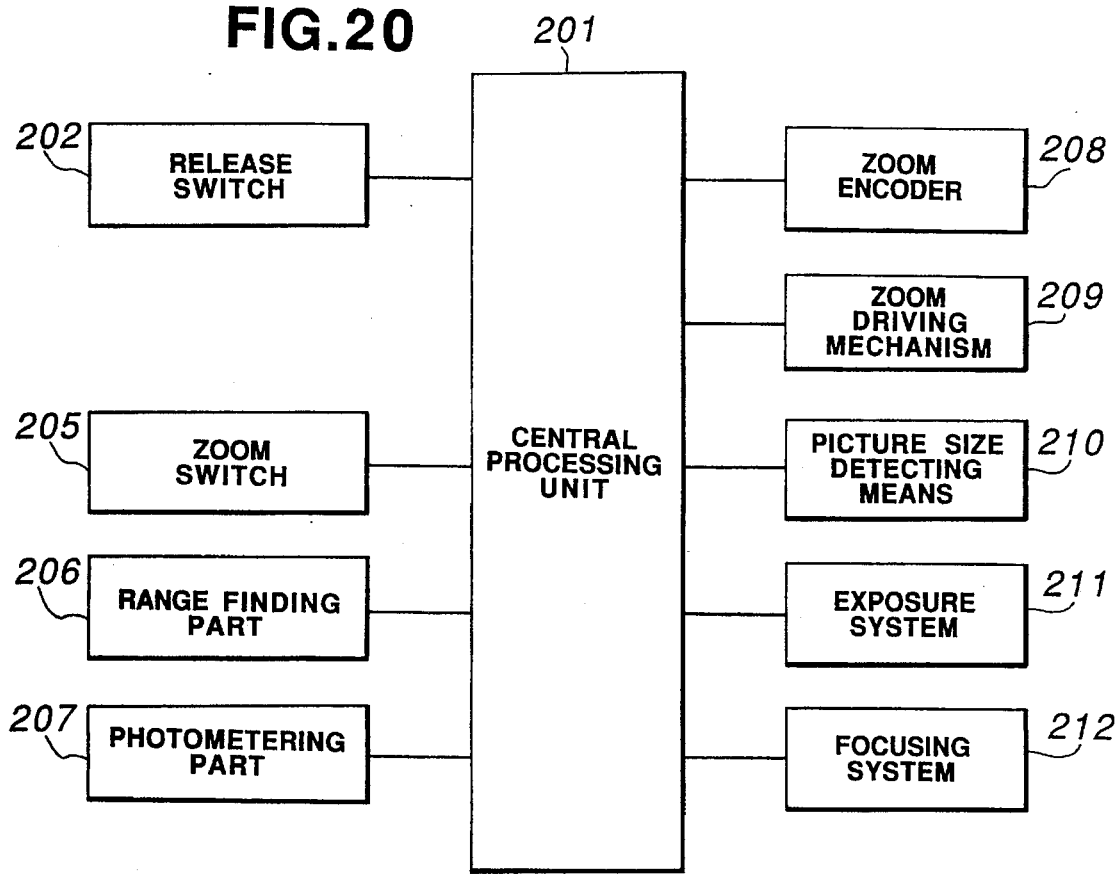

FIG. 20 is a block diagram of the second embodiment. In the same manner as the aforesaid first embodiment, a central processing unit 201 (CPU 201) is connected to a release switch 202, a zoom switch 205, a range finding part 206, a photometering part 207, a zoom encoder 208, a zoom driving mechanism 209, a picture size detecting means 210, an exposure system 211 and a focusing system 212 to form the main part.

In the second embodiment as described later, masks can be switched by switching on/off by the zoom switch 205, so that desired operation can be carried out without providing the panoramic switching switch 103 and over wide switching switch 104 as in the first embodiment. Specifically, the zoom switch 205 is formed to make the cam ring 306 move to the mask switching region by switching the switch on for a predetermined time at a wide end or a tele end.

Next, the operation of the second embodiment will be explained using a flowchart in FIG. 21.

Figure 21:
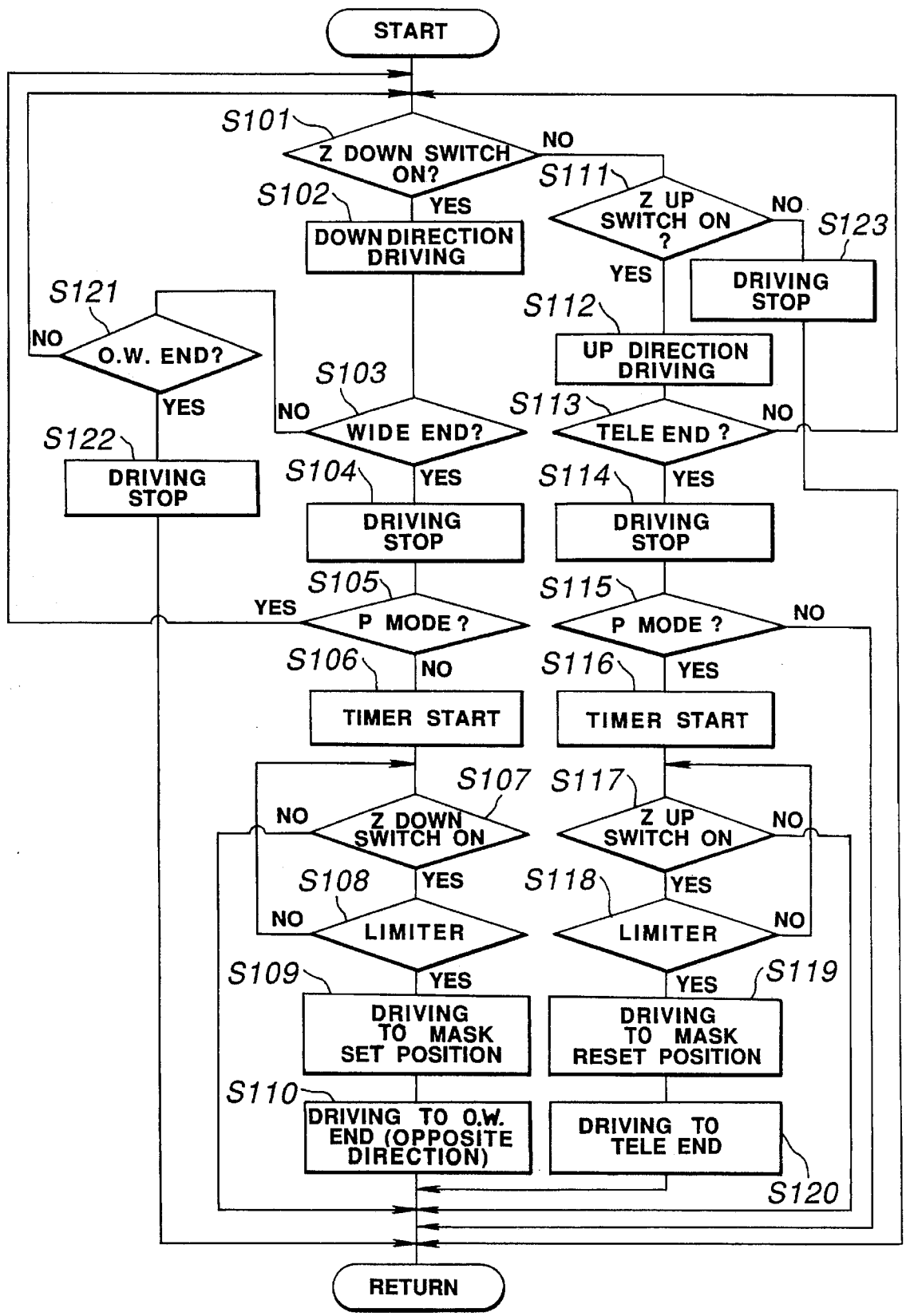

In FIG. 21, a down direction means the movement in the direction in which a focal length becomes shorter and an up direction means the movement in the direction in which a focal length becomes longer.

First of all, supposing that a zoom switch 205 is switched on from the ordinary photographing region in the zooming down direction (Z down direction, hereinafter), the process proceeds from a step S101 to a step S102 and a zoom driving mechanism 209 rotates the cam ring 306. Unless the cam ring 306 is driven to a wide or over wide position in the down direction during the rotation, driving is continued by a loop of the step S101, step S102, step S103, step S121 and the step S101 while the zoom switch 205 is on. When the cam ring 306 is driven to the wide position, the cam ring 306 promptly stops by the step S103 and step S104.

Then, a step S105 judges the actual mask state. As a result, in a case of a normal mask in the N mode, the process proceeds to a step S106 and the following steps. In a case of a panoramic mask in the P mode, the process returns to the step S101 and the exclusive range for panorama can be zoomed. If a mode is judged as the N mode and the process proceeds to the step S106, a timer starts. Specifically, this device has a four second timer, so that masks are switched when the zoom switch 205 is kept on switching in the Z down direction at the wide end for four seconds.

In other words, the timer starts at the step S106 and the step S107 judges whether the switch is kept on or not. A step S108 is to make a loop until reaching a prescribed value. Then, when "on" time reaches a limiter value, the cam ring 306 move through rotating angles θ 2 and θ S in FIG. 19 and stops by a step S109. Thus, the mask panorama switching and finder visual field switching is complete.

However, let it be assumed that a position where the mask is set is a region where a photograph cannot be taken. Therefore, the cam ring 306 is reversely rotated by a step S110 promptly after a mask is set and the cam is stopped in an over wide position to make it possible to take pictures. In this state, zooming photography can be selectively taken in the exclusive region for panorama and in the ordinary using region.

Next, a case in which the zoom switch 205 is on in the zoom up direction (Z up direction, hereinafter) will be explained.

The cam ring 306 is rotating in the up direction by the step S101, step S111 and step S112. When a tele end is judged by a step S113, the cam ring 306 promptly stops by a step S114.

In a step S115, the actual mask state is judged. That is, the rotation in the up direction operates to reset a mask in θ R range in FIG. 19, so that the operation in a step S116 and the following are not needed if the step S115 is the N mode. In a case of a panoramic mode, the timer starts by a step S116. This timer is the same four second timer as that of the first embodiment in the step S106.

In a step S117, it is identified that "switch on" is continued. In a step S118, a prescribed time is judged. Then, the cam ring 306 is rotated to the mask reset position in FIG. 19 by a step S119 and stops. In this state, the masks and finder system are completely returned from the panoramic state to the normal state. Since this reset position is a region in which a picture cannot be optically taken, the cam ring 306 rotates to the tele end in the reverse direction in a step S120, so that the consecutive flow complete.

Thus, in the second embodiment, picture sizes can be switched from a panoramic size to normal size by keeping on switching the zoom switch at the wide end or tele end for a predetermined time and the ranges from wide to over wide can be continuously used only in a panoramic mode as against the ordinary photographing range, so that a camera having extremely wide using range can be provided.

In the aforesaid first and second embodiments, the photographing optical system is one in which an over wide state exists as an extension of a wide state. The third embodiment described below uses a photographing optical system in which an over tele state exists as an extension of a tele state.

Figure 22:
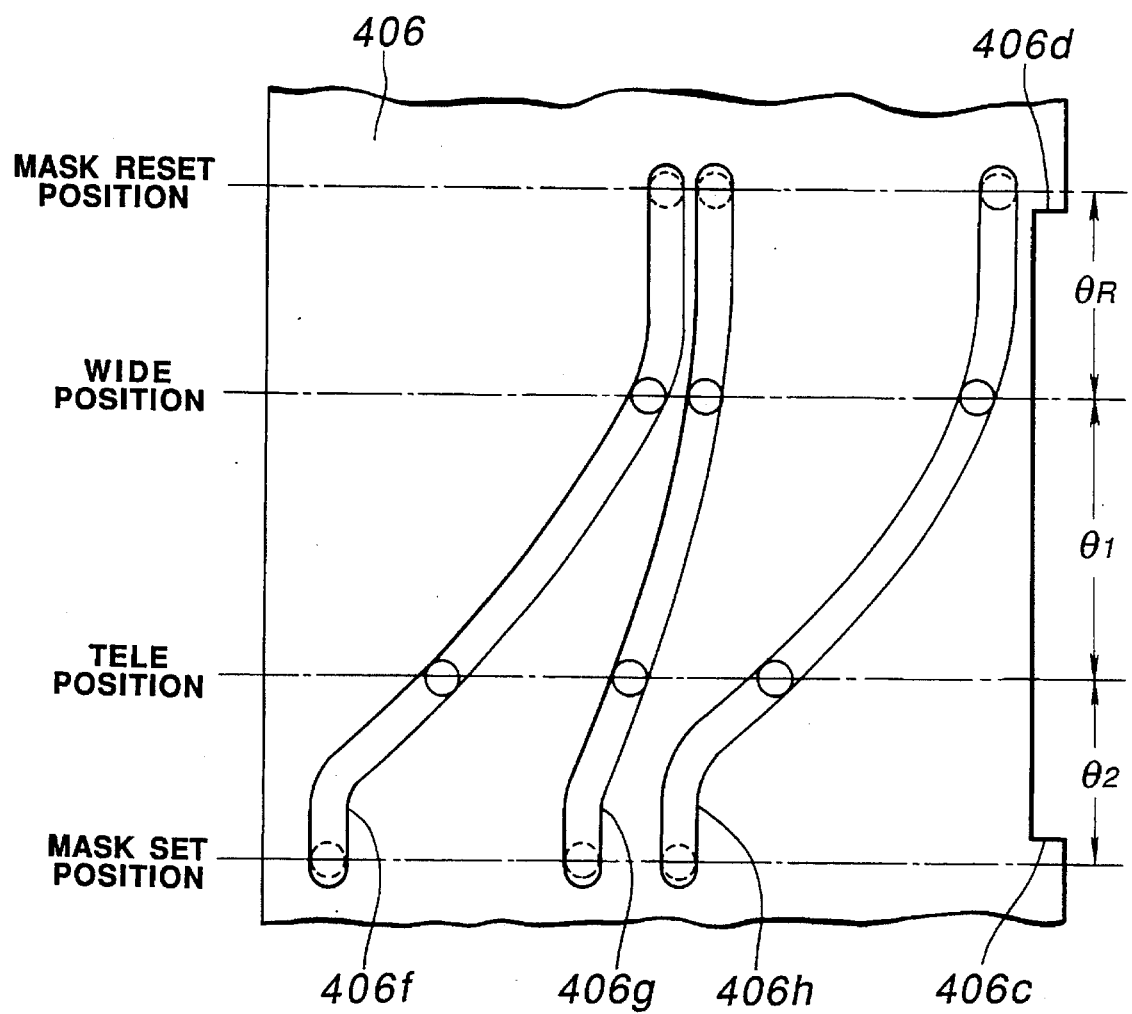
FIGS. 22–25 illustrate a third embodiment of the present invention.

FIG. 22 shows a developed view of a cam ring of a zoom camera of three groups having an over tele state. The photographing optical system not illustrated is formed of three lens groups in the same manner as in the first embodiment. A frame outline, a switching mechanism of a panoramic mask part and a switching mechanism of a finder part of the third embodiment are equal to those described in the first embodiment.

A cam ring 406 of this embodiment functions similar to the cam ring 6 in the first embodiment. The cam ring 406 is provided with the cams 406*f* for the first group, 406*g* for the second group and 406*h* for the third group which move the lens frames of the first to third groups, respectively. The cam ring 406 is moved in the up and down directions in FIG. 22 by a driving system(not illustrated) and rotates, for example, the operating arm 3*f* of the P ring 3 (the operating arm 33*f* of the P ring 33) by contact surfaces 406*c* and 406*d* as described in the first embodiment.

The rotated region of the aforesaid cam ring 406 is an ordinary zooming region in which the range θ 1 covers from a wide position to a tele position. The position further rotated from the tele position only by θ 2 is a mask set position. In the mask set position, a mask is switched to panorama by the same mechanism as that of the aforesaid first embodiment and the photographing optical system is set in a further telephotographic area than the ordinary zooming region. In addition, a position rotated from the wide position by θ R is a mask reset position. When a position is rotated to the mask reset position, a mask of a panoramic state is switched to a normal state.

Here, the ordinary zooming region is a region which is three times as large as 35–105 mm in the same manner as the first embodiment and has a focal length 120 mm from the over tele state. Since the photographing optical system of the first embodiment is applied to a photographing optical system of this embodiment, a detailed explanation is not provided. However, the photographing optical system is previously formed so that focusing or the like is not interfered in the over tele state in which an interval between the second and third groups becomes narrower than the tele state.

Next, a movement of the cam ring 406 in this embodiment in connection with the finder cam 7 will be explained on the basis of FIGS. 23 and 24. The finder cam 7 is engaged with guide pins 406*a* and 406*b* of the cam ring 406. Also, the basic operation of the cam ring 406 is equal to that of the aforesaid first embodiment, therefore, detailed explanation is omitted.

Figure 23:
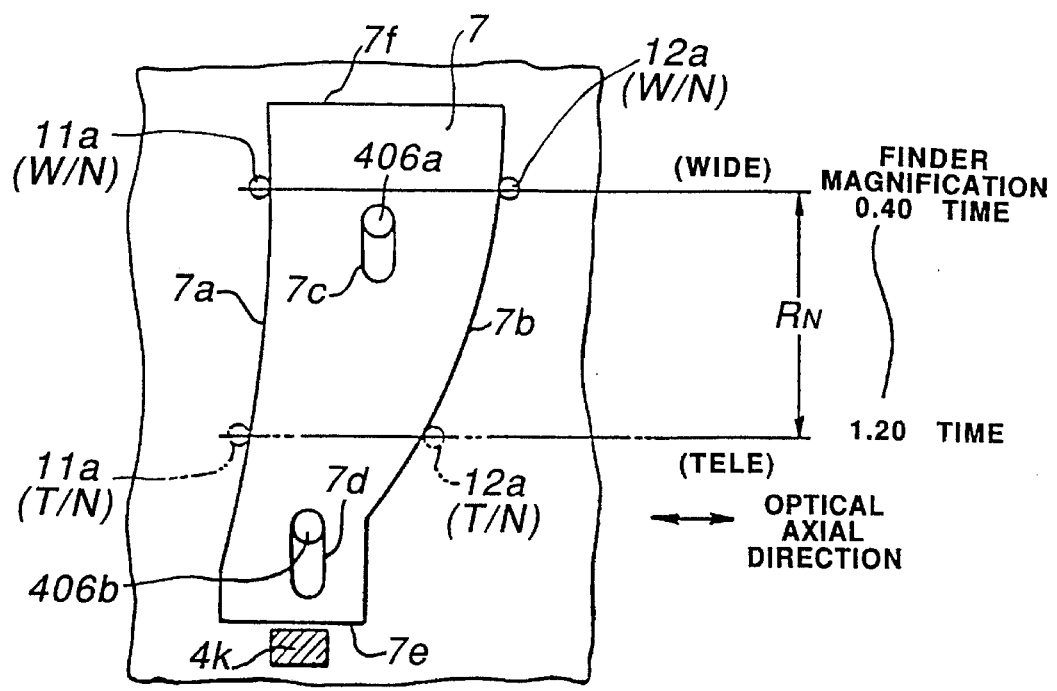
Figure 24:
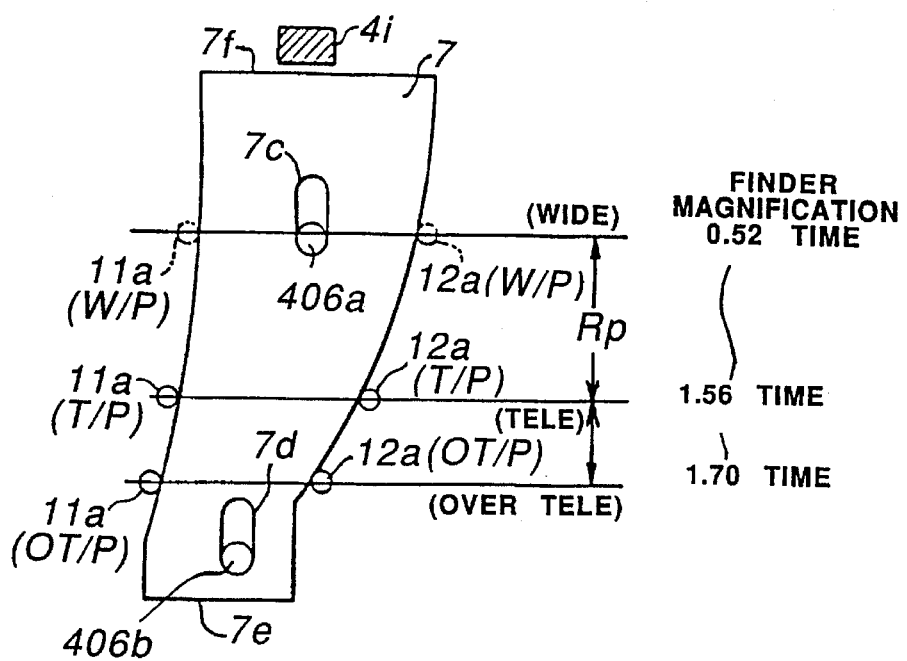

FIG. 23 shows a finder state at the time of N photographing. In FIG. 23, a region used for a finder as against three times zoom is RN. On the other hand, FIG. 24 shows a finder state at P photographing. In FIG. 24, three time zooming region is shifted to RP and a position of finder magnification 1.70 time is provided in response to an over tele position.

That is, the finder magnification is 0.4–1.20 time at the time of N photographing and 0.52–1.56 time and 1.70 time at the time of P photographing. Thus, a finder which is easier to see can be provided at the time of P photographing.

Figure 25:
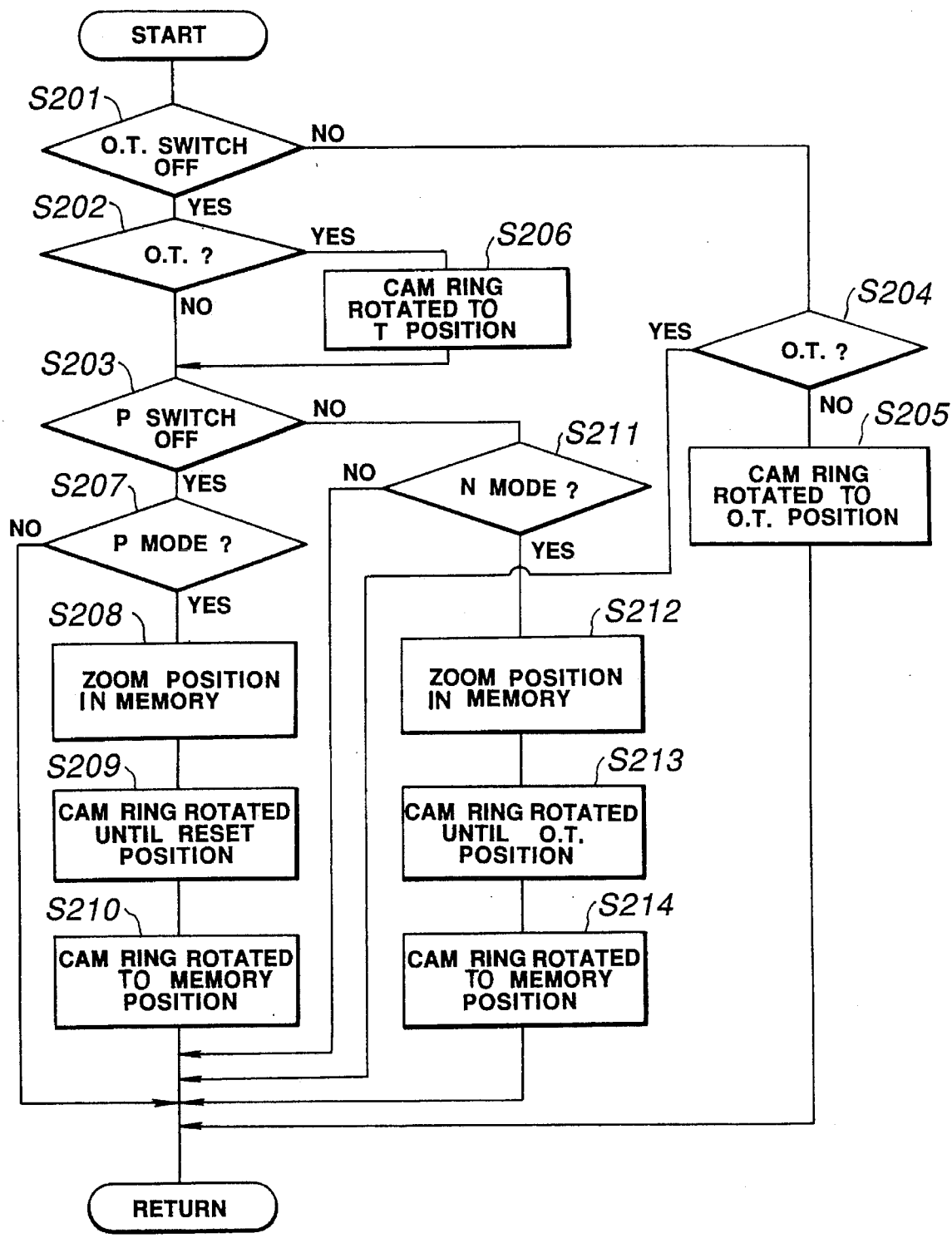

The electric construction of the main part in this embodiment adopts an over tele switch (O.T. switch, hereinafter) designating an over tele state instead of the over wide switching switch 104 as a photographing optical region selecting switch for selecting a photographing optical system in a specific position in the block diagram (FIG. 17) of the first embodiment. Its operation will be explained on the basis of the flowchart in FIG. 25.

In this embodiment, only when the O.T. switch which is an outer operating member, is on, a step S201 can jump to a step S204 so as to be able to move to the over tele (O.T.) state and when the actual zoom position does not coincide with the position of the O.T. state, the cam ring 406 rotates and stops at the O.T. position (S205).

Then, if the O.T. switch is switched off, the process proceeds from the step S201 to the step S202 and the actual zoom position is identified. At the O.T. state, the cam ring 406 is promptly rotated to a tele position (T position) in a step S206 and the process proceeds to a step S203 and the following.

Next, the step S203 and the following will be briefly explained. When the P switch 103 is off, the process proceeds from a step S203 to a step S207 and the P mode is identified. When the P mode is canceled, the cam ring 406 is rotated to a reset position (step S209), and then, promptly rotated to the original position (step S210).

On the other hand, if the P switch 103 is on, it is identified whether the actual mask state is a N mode or not. In a case of N mode, by the step S212 to the step S214, the process proceeds from the zoom position memory to mask state at the O.T. position and finder switching and also proceeds to the cam ring rotated to the finder switching memory position in turn. The other steps are similar to those of the first embodiment.

In the third embodiment, an example of a photographing optical system having the over tele state is shown. A mask shape of this embodiment is not restricted to a panorama. As explained by means of the image circle in FIG. 1, a pseudo-telephotographic effect can be emphasized by switching a half size to a normal size, and vice versa. Further, the photographing optical system comprises an over tele state and over wide state, which can be formed to be able to move only when a small photographed picture size is used.

Even if a range can be used only at the time of the small picture size is not only one point but exists continuously in the tele area and wide area of the ordinary zooming region (zooming region at the time of normal size), it is not a problem, so that a more useful camera can be provided.

Although the zoom lenses of three group types are explained on each embodiment, a lens type is not restricted to the three group types and can be applied to zoom types other than the three group types and two focal point lens. Also, focusing groups are not restricted to an inner focus type. Even in a case of a single-lens reflex type instead of a lens shutter type, similar effect can be obtained.

According to the present invention, it is apparent that a variety of embodiments can be formed on the basis of the invention. This invention is restricted to appended claims but not limited to any particular embodiments.

What is claimed is:

1. A photographed picture size switchable camera comprising:

photographed picture size selecting means for selecting one of a photographed picture size of a normal size and a size smaller than said normal size:

photographed picture size switching means for switching a photographed picture size to a size selected by said photographed picture size selecting means:

a photographing optical system moveable over an ordinary zooming region having a telephotographic end and a wide-angle end and further extending to a location at one end of the ordinary zooming region which is wider than the wide-angle end of said ordinary zooming region and moveable to another region at an opposite end of the ordinary zooming region and which extends beyond the telephotographic end of said ordinary zooming region, and wherein the optical performance of the photographing optical system at peripheral portions of a photographed picture deteriorates when the optical system is located at a position wider than a given wide-angle region or at a telephotographic region beyond the ordinary zooming region, said photographed picture size selecting means including mask means for reducing a photographed picture size by masking a peripheral portion of a normal size picture in which deterioration in picture quality occurs and which deterioration cannot be corrected, so that a picture size is reduced and said deteriorated peripheral areas which are masked are eliminated from a photographed image;

moving means for moving said photographing optical system;

said mask means covering a marginal portion of an entire periphery of a normal picture size to eliminate said deteriorated peripheral areas: and said mask means covering a marginal portion of an entire periphery of a normal picture size to eliminate said deteriorated peripheral areas.

2. The camera according to claim 1 wherein said moving means for moving said photographing optical system is a zoom driving mechanism driven by a zoom switch and means for operating said photographed picture size switching means to switch said photographed picture size to a picture size in which a peripheral portion of the normal picture size is masked responsive to a movement in which said zoom driving mechanism moves said photographing optical system to a region other than said ordinary zooming region.

3. The camera according to claim 1 wherein photographed picture size selecting means includes a panorama switching switch for switching a photographed picture size from a normal size to a panoramic size, and vice versa and a photographing optical region selecting switch for selecting said photographing optical system in a specific position.

4. The camera according to claim 1 wherein a region where optical performance in photographed picture edges in said wide angle being wider than said ordinary zooming region deteriorates is linearly set in a range between focal lengths of 28–35 mm.

5. A method for operating a camera comprising adjustable photographing optical zoom means movable over a predetermined focal range, a mask means for controlling the picture size in a film plane region between a normal size and a small size smaller than normal size, a mask size selecting switch for selecting one of the normal and small mask sizes, and an over-wide operating switch, said method comprising the steps of:

(a) determining if the over-wide switch has been operated;

(b) adjusting said optical means if the over-wide switch has been operated and the lens is not in the over-wide position;

(c) moving the optical means to the wide position when the over-wide switch has not been operated and the optical means is in the over-wide position;

(d) storing in a memory the present zoom position of the optical means if the mask switch has not been operated and the mask means is in the small size state;

(e) moving the lens to a reset position;

(f) moving the lens to the zoom position stored in memory in step (d);

(g) storing the zoom position in memory if the mask switch is operated and the mask means is in the normal size mode; and (h) operating the lens to the over-wide position;

(i) thereafter moving the photographing lens to the position stored in memory in step (g).

6. A method for operating a camera having a zoom-type photographing lens and zoom up and zoom down switches, mask means for masking film in a film plane to control picture size to either a normal size or a small size smaller than said normal size, said method comprising the steps of:

(a) continuously driving the zoom lens in a down direction toward a wide end and an over-wide end condition when the down switch is on;

(b) stopping driving of the zoom lens in the downward direction when the zoom lens has reached the wide end condition;

(c) stopping driving of the zoom lens when the zoom lens has reached the over-wide end condition before reaching the wide-end condition;

(d) repeating steps (a) and (b) when the mask means is in a small size mode;

(e) initiating a timing interval when the mask means is in the normal size mode;

(f) driving the mask means to a set position when the zoom down switch is still on after performing step (e) and the timing interval has elapsed; and (g) driving the zoom lens to the over-wide position.

7. The method of claim 6 further comprising the steps of:

(h) driving the zoom lens in the zoom up direction when the zoom up switch is on and the zoom down switch is off;

(i) returning to step (a) when the zoom lens has yet to reach the telephoto end;

(j) stopping driving of the optical means when the telephoto end has been reached;

(k) initiating a timing interval when the mask means is in the small size mode;

(l) driving the optical means to the mask reset position when the zoom up switch is on and the timing means is timed out; and (m) thereafter driving the optical means to the telephoto condition.

8. A method for operating a camera having an adjustable zoom lens and mask means for masking film in a focal plane before selectively taking pictures of a normal size and a small size smaller than said normal size, an adjustable finder optical system for viewing an object and movable between a wide and over telephoto range which encompasses a telephoto range and an over telephoto operating member and a mask switch operating member, said method comprising the steps of:

(a) moving the finder optical system to the over telephoto position when the over telephoto switch is on and the finder optical system is not in the over telephoto position;

(b) moving the finder optical system to the telephoto position when the over telephoto switch is off and the finder optical system is in the over telephoto position;

(c) storing a present zoom position of the finder optical system in a memory when the mask setting switch is off and the mask means is in the small size mode; and (d) moving the finder optical system to a reset position and thereafter to the position stored in memory in step (c).

9. The method of claim 8 further comprising the steps of:

(e) storing the present position of the finder optical system in a memory when the mask means operating member has been operated and the mask means is in the normal mode; and (f) moving the finder optical system to an over telephoto position and thereafter moving the finder optical system to the position stored in memory in step (e).

10. A photographed picture size switchable camera comprising:

photographed picture size selecting means for selecting one of a photographed picture size of a normal size and a size smaller than said normal size;

photographed picture size switching means for switching a photographed picture size to a size selected by said photographed picture size selecting means;

a photographing optical system moveable over an ordinary zooming region having a telephotographic end and a wide-angle end and further extending to a location at one end of the ordinary zooming region which is wider than the wide-angle end of said ordinary zooming region and moveable to another region at an opposite end of the ordinary zooming region and which extends beyond the telephotographic end of said ordinary zooming region, and wherein the optical performance of the photographing optical system at peripheral portions of a photographed picture deteriorates when the optical system is located at a position wider than a given wide-angle region or at a telephotographic region beyond the ordinary zooming region, said photographed picture size selecting means including mask means for reducing a photographed picture size by masking a peripheral portion of a normal size picture in which deterioration in picture quality occurs and which deterioration cannot be corrected, so that a picture size is reduced and said deteriorated peripheral areas which are masked are eliminated from a photographed image;

moving means for moving said photographing optical system; and said mask means covering a marginal portion of an entire periphery of a normal picture size to eliminate said deteriorated peripheral areas.

11. A photographed picture size switchable camera comprising:

photographed picture size switching output means for outputting a state for selectively switching to one of an ordinary picture size and a small picture size smaller than the ordinary picture size;

photographed picture size switching means, arranged on a front surface of a picture frame, for switching a picture mask of said ordinary picture size to a picture mask of said smaller picture size responsive to a switching operation of an operating means outside of said camera so that aberration occurring in peripheral areas of an ordinary size picture is covered with mask means forming part of said photographing picture size selecting means whereby deteriorated areas of picture quality are masked when the smaller photographed picture size is selected;

a photographing optical system having a first focal length photographing range usable when a picture size is switched to either of an ordinary picture size and a smaller picture size which is smaller than the ordinary picture size; said photographing optical system having a second focal length range, extending in a continuous manner from one end of said first focal length range, said second focal length range being usable only when a picture size is switched to said smaller picture size;

a photographed picture in said second focal length range having inferior optical performance in a peripheral part of a photographed picture as compared with a photographed picture in said first focal length range, said inferior optical performance in said peripheral part being covered with said picture mask;

driving means for changing a focal length of said photographing optical system; and controlling means for setting a focal length of said photographing optical system within said first focal length range or said second focal length range when a picture size is switched to said smaller picture size.

12. The camera according to claim 11 wherein said small picture size is a panoramic size.

13. The camera according to claim 11 wherein said small picture size is a half size.

14. The camera according to claim 11 wherein the optical performance deteriorates around an image circle.

15. The camera according to claim 11 wherein said controlling means has an automatic exposure means and stops down a diaphragm to a value smaller than an open aperture F value when said photographing optical system is positioned within the other focal length range.

16. A photographed picture size switchable camera comprising:

photographed picture size selecting means for selecting one of a photographed picture size of a normal size and a size smaller than said normal size;

photographed picture size switching means for switching a photographed picture size to a size selected by said photographed picture size selecting means:

a photographing optical system being capable of zooming in and out within a first range in which good optical performance is produced in a peripheral part of a photographed picture when a photographed picture size is switched to a photographed picture size of said normal size and being capable of zooming in and out within a second range in which inferior optical performance is produced in a peripheral part of a photographed picture; and wherein, when a picture is taken using the range in which said inferior optical performance produced, said small picture size is selected to cover said peripheral part of a photographed picture of said normal picture size;

the range in which the inferior optical performance is produced is arranged on a wide-angle side of the range in which the inferior optical performance is not produced; and the range in which the inferior optical performance is produced being arranged beyond a telephotographic side of the range in which the inferior optical performance is not produced.

17. A photographed picture size switchable camera comprising:

photographed picture size selecting means for selecting one of a photographed picture size of a normal size and a size smaller than said normal size;

photographed picture size switching means for switching a photographed picture size to a size selected by said photographed picture size selecting means;

a photographing optical system moveable over an ordinary zooming region having a telephotographic end and a wide-angle end and further extending to a location at one end of the ordinary zooming region which is wider than the wide-angle end of said ordinary zooming region and moveable to another region at an opposite end of the ordinary zooming region and which extends beyond the telephotographic end of said ordinary zooming region, and wherein the optical performance of the photographing optical system at peripheral portions of a photographed picture deteriorates when the optical system is located at a position wider than a given wide-angle region or at a telephotographic region beyond the ordinary zooming region, said photographed picture size selecting means in including mask means for reducing a photographed picture size by masking a peripheral portion of a normal size picture in which deterioration in picture quality occurs and which deterioration cannot be corrected, so that a picture size is reduced and said deteriorated peripheral areas which are masked are eliminated from a photographed image;

moving means for moving said photographing optical system;

said mask means covering a marginal portion of an entire periphery of a normal picture size to eliminate said deteriorated peripheral areas; and said normal picture size having a substantially rectangular shape and wherein said mask means masks peripheral portion of all four sides of said rectangular shape normal picture size.

* * * * *